US007413442B2

(12) United States Patent
Okunishi et al.

(10) Patent No.: US 7,413,442 B2
(45) Date of Patent: Aug. 19, 2008

(54) LEARNING SUPPORT SYSTEM

(75) Inventors: Toshiyuki Okunishi, Higashiosaka (JP); Naoko Shinozaki, Nara (JP); Kazuo Nishiura, Nara (JP); Ichiko Sata, Nara (JP); Yoji Fukumochi, Ikoma-gun (JP); Takeshi Kutsumi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 877 days.

(21) Appl. No.: 10/206,860

(22) Filed: Jul. 29, 2002

(65) Prior Publication Data

US 2003/0046057 A1 Mar. 6, 2003

(30) Foreign Application Priority Data

| Jul. 27, 2001 | (JP) | 2001-228211 |
| Jul. 27, 2001 | (JP) | 2001-228212 |
| Jul. 27, 2001 | (JP) | 2001-228213 |

(51) Int. Cl.
*G09B 11/00* (2006.01)

(52) U.S. Cl. ........................ 434/323; 434/350; 434/169

(58) Field of Classification Search ................ 434/322, 434/323, 350, 353, 362, 169
See application file for complete search history.

(56) References Cited

U.S. PATENT DOCUMENTS

| 4,820,167 A | * | 4/1989 | Nobles et al. ............... 434/336 |
| 5,002,491 A | * | 3/1991 | Abrahamson et al. ....... 434/322 |
| 5,294,229 A | * | 3/1994 | Hartzell et al. .............. 434/336 |
| 5,769,643 A | * | 6/1998 | Stevens, III .................. 434/350 |
| 5,957,699 A | * | 9/1999 | Peterson et al. ............. 434/350 |
| 6,091,930 A | * | 7/2000 | Mortimer et al. ............ 434/362 |
| 6,181,910 B1 | * | 1/2001 | Jerrold-Jones et al. ...... 434/353 |
| 6,393,253 B1 | * | 5/2002 | Kitabatake .................. 434/350 |
| 6,688,891 B1 | * | 2/2004 | Sanford ....................... 434/365 |
| 2002/0042790 A1 | * | 4/2002 | Nagahara ....................... 707/4 |

FOREIGN PATENT DOCUMENTS

| JP | 9-185627 | 7/1997 |
| JP | 9-330011 | 12/1997 |
| JP | 11-109841 | 4/1999 |
| JP | 11-282826 | 10/1999 |
| JP | 2000-194251 | 7/2000 |
| WO | WO 01/16917 A2 * | 3/2001 |

* cited by examiner

*Primary Examiner*—Kathleen Mosser
(74) *Attorney, Agent, or Firm*—Nixon & Vanderhye, PC

(57) ABSTRACT

A learning support system has an information processing apparatus, a portable information terminal and a learning management server which are connected through a network. The information processing apparatus includes a second memory unit for storing first learning information which includes result of learning, and the portable information terminal includes a fourth memory unit for storing second learning information which includes result of learning at the portable information terminal, and the learning management server includes a fifth memory unit for storing the first learning information transferred from the information processing apparatus and the second learning information transferred from the portable information terminal. The information processing apparatus or the portable information terminal carries out continuous learning after learning information of other party is acquired through the fifth memory unit.

27 Claims, 31 Drawing Sheets

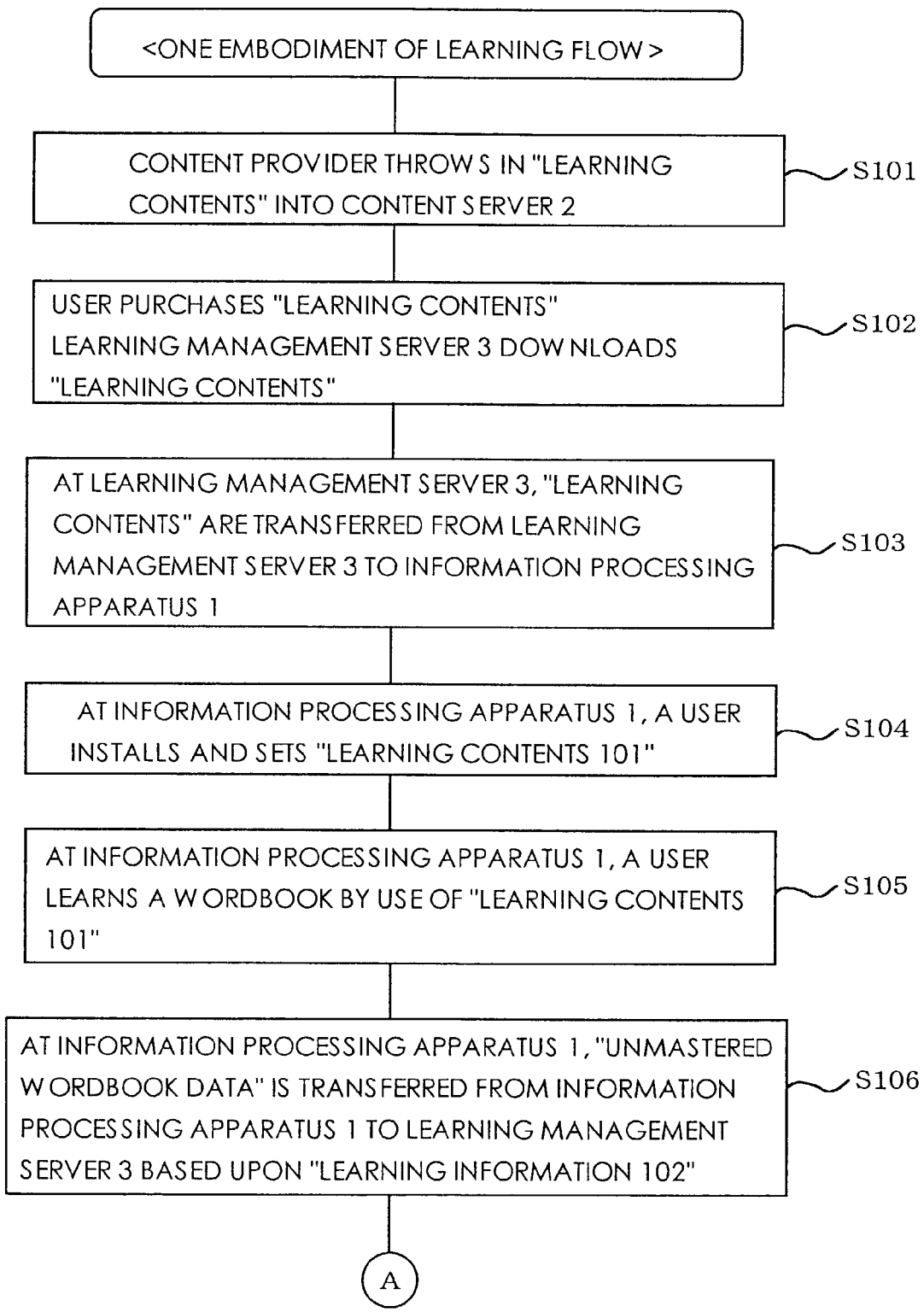

FIG. 4

WORD ADD · MODIFY

[ADD THIS CONTENT] [MODIFY BY THIS CONTENT] [DELETE THIS WORD] [CANCEL] [PREVIOUS] [NEXT]

UPDATED DATE _____ CHECK COLUMN _____ ◎: FULLY MEMORIZED (TEST UNNECESSARY) MASTER DATE _____ [CHANGE]

ENGLISH: pen
JAPANESE: ペン
SOURCE: _____ ▶

ENGLISH [NOUN ▶] → CONSULT E-J DICTIONARY
WORD _____ → CONSULT J-E DICTIONARY
CLASS _____ → LISTEN PRONUNCIATION

ILLUSTRATIVE SENTENCE (E): I wrote this letter with your pen.
ILLUSTRATIVE SENTENCE (J): この手紙はあなたのペンを使って書きました。
DIFFICULTY LEVEL _____ SYNONYM [pencil] CONTENT NAME _____
REMARKS _____

ATTACHMENT
1. bmp [OPEN] [REFERENCE]
2. wav [OPEN] [REFERENCE]
3. ___ [OPEN] [REFERENCE]

FREQUENCY OF APPEARANCE (IN TEXT) _____ TIMES

<MEMO>
PLEASE FEEL FREE TO USE

REGISTRATION DATE _____ PRESENTATION DATE _____ TIMES NUMBER OF TEST PRESENTATION _____ TIMES

FIG. 8

SEARCH WORD FILE

| INDEX | TRANSLATION | WORD CLASS | REGISTRATION DATE |
|---|---|---|---|
| ball | ボール;球技 | NOUN | 2001/6/16 |
| boy | 男の子;息子;給仕 | NOUN | 2001/6/17 |
| pen | ペン;文筆業;文体 | NOUN | 2001/6/15 |

FIG. 9

DICTIONARY DATA FILE

<見>pen</>
<品>[名]</>
<訳>1 ペン[万年筆・ボールペン]</>
<用英>write with a ～ and ink</><用訳>ペンとインクで書く</>
<訳>2 文筆業,ペン;</>
<用英>The ～ is mightier than the sword.</><用訳>ペンは剣よりも強し</>
<訳>3 文体,文筆の才;</>
<用英>a fluent ～</><用訳>流暢な文体</>
<品>[動]</>
<訳>[手紙]を書く</>

FIG. 10

WORDBOOK STORAGE BUFFER

| pen,ペン;文筆業;文体, |
|---|

FIG. 11

WORDBOOK FILE

| INDEX | TRANS-LATION | WORD CLASS | REGISTRATION DATE | TAKEN-OUT DATE | CHECK COLUMN | MASTER DATE | FREQUENCY OF APPERANCE |
|---|---|---|---|---|---|---|---|
| work | 仕事 | NOUN | 2001/3/10 | 2001/5/10 | | | 5 |
| boy | 男の子;息子;給仕 | NOUN | 2001/5/20 | 2001/5/20 | | | 1 |
| girl | 女の子 | NOUN | 2001/5/20 | 2001/5/20 | | | 1 |
| pen | ペン;文筆業;文体 | NOUN | 2001/5/23 | 2001/5/23 | ◎ | 2001/6/13 | 1 |
| desk | 机;デスク | NOUN | 2001/5/29 | 2001/6/10 | ◎ | 2001/6/13 | 1 |

FIG. 12

WORDBOOK FILE

| INDEX | TRANS-LATION | WORD CLASS | REGISTRATION DATE | TAKEN-OUT DATE | CHECK COLUMN | MASTER DATE | FREQUENCY OF APPERANCE |
|---|---|---|---|---|---|---|---|
| work | 仕事 | NOUN | 2001/3/10 | 2001/5/10 | | | 5 |
| boy | 男の子;息子;給仕 | NOUN | 2001/5/20 | 2001/5/20 | | | 2 |
| girl | 女の子 | NOUN | 2001/5/20 | 2001/5/20 | | | 1 |
| pen | ペン;文筆業;文体 | NOUN | 2001/5/23 | 2001/5/23 | | | 2 |
| desk | 机;デスク | NOUN | 2001/5/29 | 2001/6/10 | ◎ | 2001/6/13 | 1 |
| ball | ボール;球技 | NOUN | 2001/6/16 | | | | 1 |

FIG. 14

This is an English-Japanese translation program. It translates
English sentences into appropriate Japanese. It is useful for
English learning.

FIG. 17

CRITERION FOR DETERMINING ORDER OF TEST PRESENTATION

| FREQUENCY OF APPEARANCE | [N1] TIMES |
|---|---|
| DIFFICULTY LEVEL | [N2] LEVEL |
| TIME REQUIRED TO ANSWER | [N3] SECONDS |
| TIME REQUIRED TO MASTER | [N4] DAYS |

FIG. 19

SETTING EXAMPLE OF TAKEN-OUT INFORMATION

| TAKEN-OUT TO: |
| --- |
| PORTABLE INFORMATION TERMINAL<br>   SCREEN SIZE[110X60]   MEMORY CAPACITY:O1◎MOS<br>PORTABLE PHONE<br>   SCREEN SIZE[20X10]   MEMORY CAPACITY:O1◎M◎S |
| NUMBER TO BE TAKEN OUT<br>   [   ] WORDS<br>   [   ] MINUTES |
| TAKEN-OUT CRITERION<br>   ☐ IMPORTANT WORD FIRST<br>   ☐ WORD OF HIGH FREQUENCY OF APPEARANCE<br>   ☐ WORD HAVING DIFFICULTY MORE (LESS) THAN SETTING OF USER<br>   ☐ IMPERFECTLY MEMORIZED WORD FIRST<br>   ☐ UNPRESENTED WORD<br>   ☐ WORD WITH "UNENDED" MEMORIZATION COMPLETED MARK<br>   ☐ WORD WHICH TOOK MANY DAYS FROM REGISTRATION TILL MASTER |

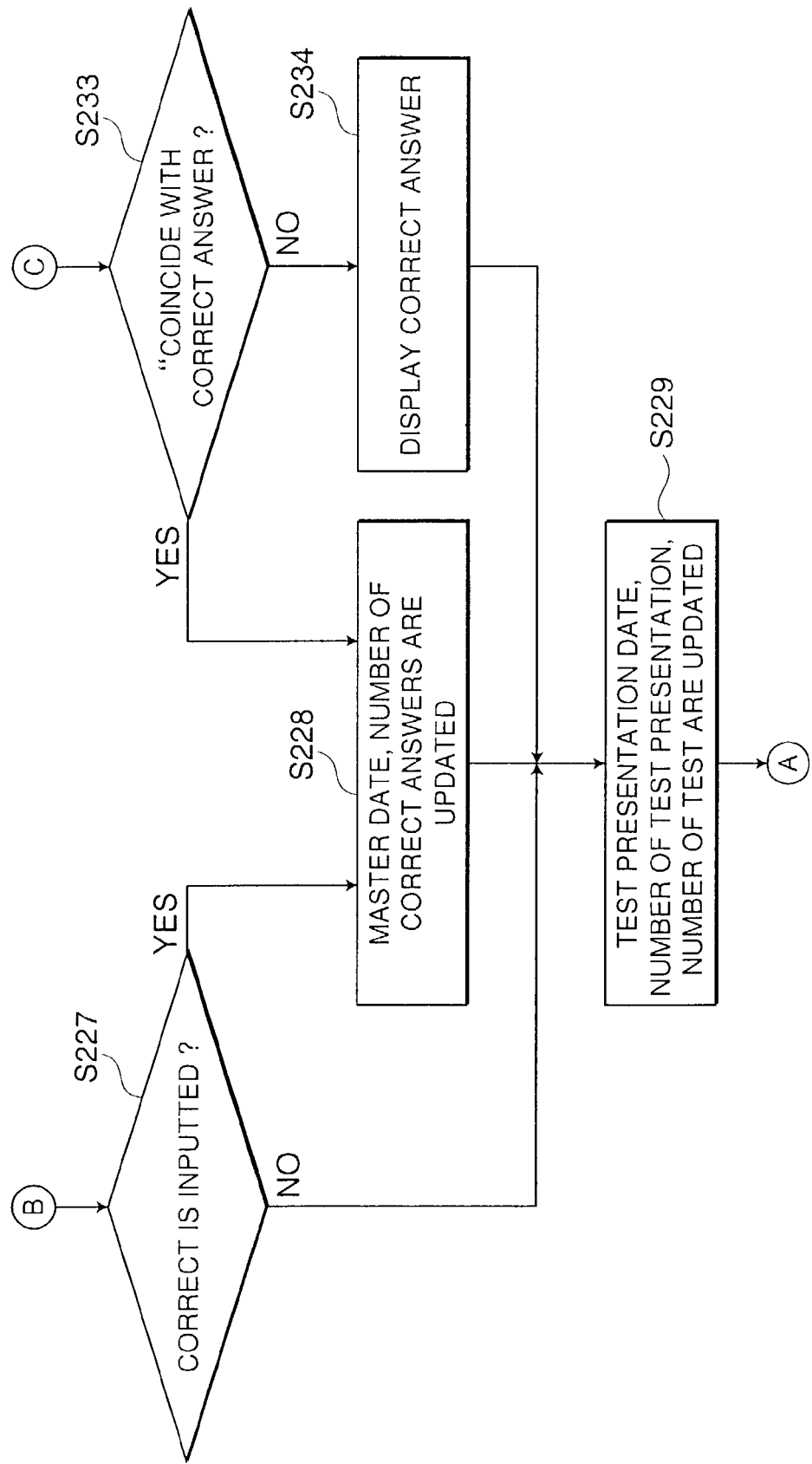

FIG. 24

| No. | INDEX | WORD CLASS | TRANS-LATION | SEMANTIC ATTRIBUTE | WRONG ANSWER EXAMPLE (1) | WRONG ANSWER EXAMPLE (2) | WRONG ANSWER EXAMPLE (3) | ILLUSTRATIVE SENTENCE |
|---|---|---|---|---|---|---|---|---|
| 1 | dainty | 形容詞 | 上品な | — | — | — | — | — |
| 2 | observation | 名詞 | 観察 | — | agreement | contract | declaration | — |
| 3 | mouth | 名詞 | 口 | — | ear | eye | hair | My (mouth) dropped out when I heard it. |
| 4 | stadium | 名詞 | 競技場 | 建物 | — | — | — | He played rugby in many stadiums. |
| 15 | hall | 名詞 | 集会所 | 建物 | — | — | — | — |
| 26 | tower | 名詞 | 塔,タワー | 建物 | — | — | — | — |
| 37 | shack | 名詞 | 小屋 | 建物 | — | — | — | — |

FIG. 25

| No. | INDEX | TRANS-LATION |
|-----|-------|--------------|
| 1-1 | dainty | 上品な |
| 1-2 | | |

FIG. 26

| No. | INDEX | TRANS-LATION | ILLUSTRATIVE SENTENCE |
|-----|-------|--------------|------------------------|
| 2-1 | mouth | 口 | My ( ) dropped out when I heard it. |
| 2-2 | | | |

FIG. 27

| No. | INDEX | TRANS-LATION | OPTION (1) | OPTION (2) | OPTION (3) |
|-----|-------|--------------|------------|------------|------------|
| 3-1 | observation | 観察 | agreement | contract | declaration |
| 3-2 | mouth | 口 | ear | eye | hair |

FIG. 28

| No. | INDEX | TRANS-LATION | OPTION (1) | OPTION (2) | OPTION (3) | ILLUSTRATIVE SENTENCE |
|-----|-------|--------------|------------|------------|------------|------------------------|
| 4-1 | mouth | 口 | ear | eye | hair | My ( ) dropped out when I heard it. |
| 4-2 | stadium | 競技場 | hall | tower | shack | He played rugby in many ( )s. |

LEARNING SUPPORT SYSTEM

CROSS-REFERENCE TO RELATED APPLICATION

This application is related to Japanese Patent Applications Nos. 2001-228211 filed on Jul. 27, 2001, 2001-228212 filed on Jul. 27, 2001 and 2001-228213 filed on Jul. 27, 2001, whose priorities are claimed under 35 USC §119, the disclosures of which are incorporated by reference in their entirety.

BACKGROUND OF THE INVENTION

1. Field of the Invention

This invention relates to a learning support system, and particularly, a learning support system in which learning data are transferred and managed between various information terminals through networks such as Internet. More particularly, this invention relates to an information processing apparatus and portable information terminals which are used in the learning support system.

2. Description of the Related Art

Since early times, electronic education systems using the Internet have been developed. For example, there was such a system that an education server and student terminals are connected through the Internet, a student sends data to the education server by inputting data into a form in a home page, and at the side of the education server, the received data is read/written and processed to a file of textual form by a CGI program and thereafter, sent back to the home page to be displayed.

Japanese Unexamined Patent Publication No. Hei 11(1999)-282826 describes an electronic education system in which student terminals and an education business owner terminal are connected to an electronic education server through the Internet. The electronic education server stores educational contents which are remotely thrown into the electronic education server from the education business owner terminal and provides students tests in the form of a home page based upon the educational contents. Students throw answers and/or inquiries into the tests provided in the form of the home page. The system is capable of providing educational services which correspond to each student in accordance with their learning curves with respect to each student.

Further, Japanese Unexamined Patent Publication No. 2000-194251 describes a learning support system in which a server having learning material databases storing learning content materials and a plurality of computers having a content browser for obtaining the learning content material and a report editor for supporting preparation of a report by using the obtained material are connected through the Internet.

However, in these precedent systems, it is possible to automatically prepare tests which fit to students by analyzing and compiling answers of students at the server side, but there is a necessity of large capacity to store learning programs and learning data, and a student terminal is limited to a desk-top type personal computer which is placed at home or a notebook type personal computer.

Further, in case that a student carries out learning by use of a portable terminal, functions are limited since its capacity is small, and even in case that a student has both his/her own personal computer and a portable terminal at home, they are not linked with each other for learning. That is, in case that a student carries out learning by using both of a personal computer and a portable terminal, learning is carried out differently and respectively, and even in case that learning is completed by one of the computer and portable terminal, the other may present a test which contains the same contents as the completed one so that effective learning may not be carried out.

Further, in case of learning at home, it is possible to carry out multidirectional learning since learning can be carried out by securing a plenty of time in calm environment and by consulting a text book, but in case of a portable terminal, it is difficult to do the same learning as at home since there may be a case that long and concentrated time can not be secured for example during commute to and from work, and it is suitable to use such time for learning with easy operation such as memorization of words at most.

Furthermore, for example, in case learning is temporarily discontinued, it is advantageous to users if its learning can be continued at a portable terminal by reflecting the result of the at-home learning or halfway out-turn, and conversely, if learning discontinued at a portable terminal can be continued at a home personal computer, it is considered that more effective learning can be carried out.

This invention relates to information processing systems which are used in learning support systems, and particularly, information processing apparatus for preparing a data file of words which are searched by dictionary search or translation software and for learning the words in an information processing terminal such as a personal computer.

Since early times, such a search application software has been marketed that has a function for converting English words or Japanese words, which users have inputted, into Japanese words or English words. Also, such a learning application software has been marketed that has a function for preparing English word learning tests by use of illustrative sentences stored in an electronic dictionary such as English Japanese dictionary or Japanese English dictionary.

Japanese Unexamined Patent Publication No. Hei 11(1999)-109841 describes a language learning apparatus in which for example, in case that carried out is an operation for converting a letter string of a first language (for example, Japanese) which is inputted, into a letter string of a second language (for example, English), conversion history data comprising the letter strings and word class data relating to the letter strings is stored, and learning tests are prepared by the conversion history data, and the prepared tests are used for users to answer, and thereby, users can learn words which they could not answer.

Further, Japanese Unexamined Patent Publication No. Hei 9 (1997)-185627 describes an electronic dictionary with a wordbook function which is used for rote learning of words by calling out words in registered order, which words are registered together with their meanings after consulting a dictionary is carried out by inputting spellings of words.

Such an information processing apparatus is designed to store history data in association with an operation for consulting a dictionary in case that an electronic dictionary is consulted for looking up unknown meaning and spelling, and to prepare learning data.

However, precedent learning apparatus simply consults a dictionary for a word which a user inputs, and it is possible to prepare a learning test by use of the word but it is not possible to present a test sentence which corresponds to learning level of a user. That is, learning curb or rote memorization level of a user is not considered.

Further, it is possible to carry out learning by calling out the registered words in various orders (such as registered order or alphabetical order) which users designate, but the number of consulting a dictionary as to the same word or whether it is a word for a user to feel difficulty in memorizing is not considered.

Accordingly, it is not necessarily mean to be able to learn effectively corresponding to learning curbs and intelligibility of users.

Further, this invention relates to portable information terminals and for example, portable type electronic learning apparatus used for learning a language.

Heretofore, as an electronic learning apparatus for learning foreign languages, there is an apparatus in which a word and a sentence of a foreign language are displayed and then, a user (respondent) is asked to input an answer and then, after being judged whether the inputted answer is correct or not, it is displayed and then, if the answer is wrong, a correct answer is displayed. Since, in such an electronic learning apparatus, words and sentences as a test are stored in a memory in advance, a memory of large capacity is necessitated in case that the number of a test is increased.

On the other hand, known is an apparatus having an electronic dictionary in which an index word and its illustrative sentence are extracted in a random order from the electronic dictionary, and the illustrative sentence from which the index word is removed is displayed as a test, and a plurality of index words extracted in a random order from the dictionary are given to a respondent as an option which should be filled in the removed portion (for example, see, Japanese Unexamined Patent Publication No. Hei 9(1997)-330011).

However, such an electronic learning apparatus becomes large since a large size memory is necessitated for storing an electronic dictionary.

Further, since an option is extracted in a random order from the dictionary, one which is apparently a wrong answer far from a correct answer is extracted as the option so that there occurs a problem in which it becomes difficult to carry out effective learning.

From such a point, an electronic learning apparatus which is of small size and used as a portable one and effective learning is possible regardless of time and place has been desired since early times.

In the meantime, currently, small size communication terminals with enriched portability such as portable phones are in distinguished widespread use, and miniaturization and weight saving have been advanced, and corresponding to it, communication systems and communication patterns have been extremely progressed.

SUMMARY OF THE INVENTION

Firstly, this invention has a task to provide a learning support system which is capable of continuous learning by exchanging information such as learning results of users among a plurality of terminals through a learning management server on a network The present invention provides a learning support system comprising an information processing apparatus, a portable information terminal and a learning management server, which are connected through a network, wherein the information processing apparatus comprises a first memory unit for storing first learning contents which comprise a learning program and data for use in learning, a second memory unit for storing first learning information which includes at least result of learning, a first control unit for executing the learning program, and a first communication unit for communicating with the learning management server, the portable information terminal comprises a third memory unit for storing second learning contents which comprise a portable use learning program and data for use in learning, a fourth memory unit for storing second learning information which includes at least result of learning at the portable information terminal, a second control unit for executing the portable use learning program and a second communication unit for communicating with the learning management server, the learning management server comprises a third communication unit for communicating with the information processing apparatus and the portable information terminal, and a fifth memory unit for storing the first learning information which is transferred from the information processing apparatus and the second learning information which is transferred from the portable information terminal, and the information processing apparatus or the portable information terminal carries out learning by the first control unit or the second control unit, after learning information of other party is acquired through the fifth memory unit.

According to the invention, since the learning management server stores learning information including results of learning at the information processing apparatus or the portable information terminal, continuous learning can be resumed at the information processing apparatus or the portable information terminal by use of the learning information which is stored in the learning management server, even if a user once discontinues learning at the information processing apparatus or the portable information terminal, and thus effective learning to the user can be carried out without any constrain of time and place.

The learning management server may further comprise a sixth memory unit for storing the first and second learning contents, and in case that a user purchases the first and second learning contents, the learning management server may be connected through the network to a content server which stores the first and second learning contents in order to acquire the first and second learning contents from the content server and may store them in the sixth memory unit, and the stored first and second learning contents may be transferred to the information processing apparatus and the portable information terminal, respectively.

Further, the present invention provides a learning support system wherein the information processing apparatus further comprises a first input unit, and in case that an instruction to complete learning or to discontinue learning is inputted by the first input unit, the first learning information which has been stored in the second memory unit is transferred to the learning management server through the first communication unit, and after the transferred first learning information is stored in the fifth memory unit by the learning management server, the first learning information stored in the fifth memory unit is acquired by the portable information terminal through the second communication unit and stored in the fourth memory unit, and thus continuous learning is carried out by the second control unit.

The portable information terminal may further comprise a second input unit, and in case that an instruction to complete learning or to discontinue learning is inputted by the second input unit, the second learning information which has been stored in the fourth memory unit may be transferred to the learning management server through the second communication unit, and after the transferred second learning information is stored in the fifth memory unit by the learning management server, the second learning information stored in the fifth memory unit may be stored in the second memory unit or the fourth memory unit by the information processing apparatus or the portable information terminal, and thus continuous learning may be carried out by the first control unit or the second control unit.

Still further, the present invention provides a learning support system wherein the learning management server further comprises a seventh memory unit for storing pre-registered user information, the portable information terminal comprises a plurality of portable information terminals whose users are different, and in case that the first learning information which is transferred to the fifth memory unit of the learning management server includes specific user information, the first learning information is transferred only to a portable information terminal which corresponds to user information that is stored in the seventh memory unit and coincides with the specific user information, and continuous learning is carried out by the second control unit at the corresponding portable information terminal.

Secondly, this invention provides an information processing apparatus which prepares a wordbook file by storing the number of searches in a dictionary and can control priority order of test presentation.

Thirdly, this invention provides a portable information terminal which can be miniaturized and weight-saved by use of functions of a small size communication terminal and can be used easily by incorporating with such a small size communication terminal which has been already popularized, and in which effective learning can be carried out.

BRIEF DESCRIPTION OF THE DRAWINGS

FIG. 4 is a drawing which shows a display screen of one embodiment in execution of wordbook learning in the information processing apparatus of the invention;

FIG. 8 is a drawing which shows a content of one embodiment of "a search word file" in the invention;

FIG. 9 is a drawing which shows a content of one embodiment of "a dictionary data file" in the invention;

FIG. 10 is a drawing which shows a content of one embodiment of "a wordbook storage buffer" before the wordbook file is prepared in the invention;

FIG. 11 is a drawing which shows a content of one embodiment of a wordbook file in the invention;

FIG. 12 is a drawing which shows a content of one embodiment of a wordbook file in the invention;

FIG. 14 is an explanation drawing of one embodiment of a process for acquiring an illustrative sentence file in the invention;

FIG. 17 is an explanation drawing of one embodiment of criterion items which determine priority order of test presentation in the invention;

FIG. 19 is an explanation drawing of one embodiment for setting taken-out criterion of taken-out information in the invention;

FIGS. 22(a) and 22(b) are flow charts which show operations of an embodiment of the invention;

FIG. 24 is an explanation drawing which shows receiving information of an embodiment of the invention;

FIG. 25 is an explanation drawing which shows contents of stored data of a test storage unit of an embodiment of the invention;

FIG. 26 is an explanation drawing which shows contents of stored data of a test storage unit of an embodiment of the invention;

FIG. 27 is an explanation drawing which shows contents of stored data of a test storage unit of an embodiment of the invention; and FIG. 28 is an explanation drawing which shows contents of stored data of a test storage unit of an embodiment of the invention.

DESCRIPTION OF THE PREFERRED EMBODIMENTS

Figure 1:
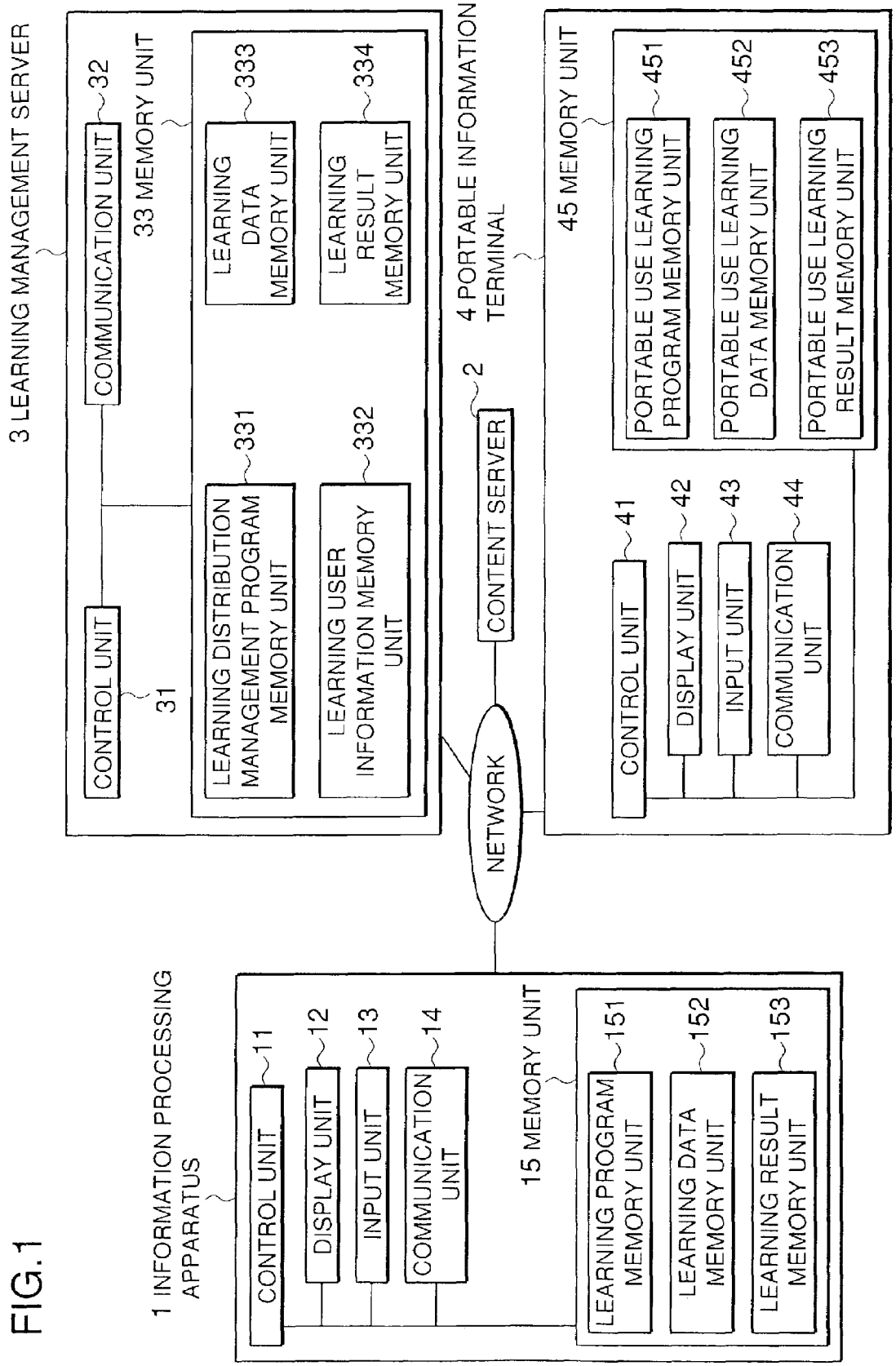
FIG. 1 is a block diagram of one embodiment of the learning support system of the invention.

A learning support system comprising: an information processing apparatus, a portable information terminal, and a learning management server, the information processing apparatus, the portable information terminal and the learning management server being connected through a network, wherein the information processing apparatus comprises a first memory unit for storing first learning contents which comprise a learning program and data for use in learning, a second memory unit for storing first learning information which includes at least result of learning, a first control unit for executing the learning program, and a first communication unit for communicating with the learning management server, the portable information terminal comprises a third memory unit for storing second learning contents which comprise a portable use learning program and data for use in learning, a fourth memory unit for storing second learning information which includes at least result of learning at the portable information terminal, a second control unit for executing the portable use learning program and a second communication unit for communicating with the learning management server, the learning management server comprises a third communication unit for communicating with the information processing apparatus and the portable information terminal, and a fifth memory unit for storing the first learning information which is transferred from the information processing apparatus and the second learning information which is transferred from the portable information terminal, and the information processing apparatus or the portable information terminal carries out learning by the first control unit or the second control unit, after learning information of other party is acquired through the fifth memory unit.

According to the invention, since learning information including results of learning at an information processing apparatus or a portable information terminal is stored in a learning management server, continuous learning may be resumed at the information processing apparatus or the portable information terminal by use of the learning information which is stored in the learning management server, even in case that a user once discontinues learning at the information processing apparatus or the portable information terminal, and effective learning to its user may be carried out without any constrain of time and place.

At the learning support system, the learning management server further comprises a sixth memory unit for storing the first and second learning contents, and in case that a user purchases the first and second learning contents, the learning management server is connected through the network to a content server which stores the first and second learning contents, the first and second learning contents are acquired from the content server and stored in the sixth memory unit, and the stored first and second learning contents are transferred to the information processing apparatus and the portable information terminal, respectively.

At the learning support system, the information processing apparatus further comprises a first input unit, and in case that an instruction to complete learning or to discontinue learning is inputted by the first input unit, the first learning information which has been stored in the second memory unit is transferred to the learning management server through the first communication unit, and after the transferred first learning information is stored in the fifth memory unit by the learning management server, the first learning information stored in the fifth memory unit is acquired by the portable information terminal through the second communication unit and stored in the fourth memory unit, and continuous learning is carried out by the second control unit.

At the learning support system, the portable information terminal further comprises a second input unit, and in case that an instruction to complete learning or to discontinue learning is-inputted by the second input unit, the second learning information which has been stored in the fourth memory unit is transferred to the learning management server through the second communication unit, and after the transferred second learning information is stored in the fifth memory unit by the learning management server, the second learning information stored in the fifth memory unit is stored in the second memory unit or the fourth memory unit by the information processing apparatus or the portable information terminal, and continuous learning is carried out by the first control unit or the second control unit.

At the learning support system, the learning management server further comprises a seventh memory unit for storing pre-registered user information, the portable information terminal comprises a plurality of portable information terminals whose users are different, and in case that the first learning information which is transferred to the fifth memory unit of the learning management server includes specific user information, the first learning information is transferred only to a portable information terminal which corresponds to user information that is stored in the seventh memory unit and coincides with the specific user information, and continuous learning is carried out by the second control unit at the corresponding portable information terminal.

Since user information is registered in the learning management server and the learning information contains the user information, a user who has learned in the information processing apparatus can continue to carry out the learning in the portable information terminal owned by the user even in case that a plurality of users carry out learning in the information processing apparatus so that a plurality of users can use the learning support system.

Hereinafter, this invention will be described in detail with reference to embodiment shown in the drawings. Incidentally, this invention is not limited by them.

In embodiments explained below, the first memory unit corresponds to a learning program memory unit 151 and a learning data memory unit 152; the second memory unit corresponds to a learning result memory unit 153; the third memory unit corresponds to a portable use learning program memory unit 451 and a learning data memory unit 452; the fourth memory unit corresponds to a portable use learning result memory unit 453; the fifth memory unit corresponds to a learning result memory unit 334: the sixth memory unit corresponds to a learning distribution management program memory unit 331 and a learning data memory unit 333; and the seventh memory unit corresponds to a learning user information memory unit 332.

The first learning contents correspond to learning contents 311, 101 of the information processing apparatus, and the second learning contents correspond to learning contents 312, 401 of the portable information terminal.

The first learning information corresponds to learning information 301, 102 of the information processing apparatus, and stored in the learning result memory unit 153, and transferred to a learning result memory unit 334 of a learning management server 3.

The second learning information corresponds to learning information 302, 402 of the portable information terminal, and stored in the portable use learning result memory unit 453, and transferred to the learning result memory unit 334 of a learning management server 3.

1. Structure of the Learning Support System

FIG. 1 shows a block diagram of one embodiment of the learning support system of the invention.

In FIG. 1, an information processing apparatus 1 is an apparatus such as a personal computer disposed in a home or an office, and a portable information terminal 4 is a portable type terminal such as PDA or a portable phone. This information processing apparatus 1 and portable information terminal 4 are supposed to belong to one user and the user is supposed to do learning by use of both two.

However, it should be appreciated that as to the information processing apparatus 1, even in case of a common use personal computer which a plurality of persons use in an office, the computer may be treated as the information processing apparatus 1 if one user can use it.

In such a common use personal computer, it should be appreciated that a user may use a learning function by inputting a password which is specific only to the user when the learning program is executed.

Further, it is not limited to one unit as to the information processing apparatus 1 and the portable information terminal 4, and may be designed to be a plurality of such units.

In the following embodiment, the information processing apparatus 1 and the portable information terminal 4 will be distinctively explained mainly from the view point of presence and absence of portability but both of them are so-called learning apparatus and therefore, the information processing apparatus 1 may be an apparatus having portability and the portable information terminal 4 may be a transportable information processing apparatus although it does not have portability like a portable phone.

The learning management server 3 may be a part of a server which is provided by a general provider and has a function for managing learning data and learning condition of a user. A content server 2 is a server owned by an education business owner which provides a user with learning contents such as an English word dictionary, a historical chronological table and technical jargon database.

In the learning support system of the invention, the information processing apparatus 1, the portable information terminal 4, the learning management server 3 and the content server 2 are connected by a network such as the Internet.

Further, in case that a user already has a learning program to be used in the information processing apparatus 1 and the portable information terminal 4 and data such as an electronic dictionary to be used for learning, it is not necessarily required to have the content server 2. The learning support system of the invention may be constructed by the structure of the information processing apparatus 1, the portable information terminal 4 and the learning management server 3.

<Structure of the Information Processing Apparatus>

Various display devices such as an LCD, an EL and a CRT may be used as a display unit 12 which visually displays information to be used for learning to users.

Various input devices such as a keyboard, a mouse, a touch panel, a track ball and a pen may be used as an input unit 13 which, other than those input devices, may have an additional function which is capable of various inputs such as various characters, signs and voices like a handwritten character input and buttons of a portable phone.

A communication unit 14 has a function for connecting to a network such as the Internet and for two-way communication with the learning management server, a content provider and other external servers.

Accordingly, the communication unit 14 has a wireless communication function such as wireless LAN and Bluetooth and a network connecting function such as a telephone line, an Ethernet LAN, ISDN and ADSL, and a TCP/IP communication function.

A memory unit 15 may be a semiconductor memory such as ROM and RAM, a memory device such as an IC card and a hard disc and a transportable memory medium such as a CD-ROM, a CD-R/CD-RW, MO and MD.

The memory unit 15 comprises a learning program memory unit 151 for storing a learning program which realizes each function of the learning apparatus of the invention, a learning data memory unit 152 for storing information by which a user learns words etc. (wordbook data, illustrative sentences and test sentences) and a learning result memory unit 153 for storing the learning result of the user.

Here, it is preferable to use a read only semiconductor memory such as ROM as the learning program memory unit 151, but a rewritable RAM and an IC card may be used to change a learning object.

Further, the learning program may be stored in a rewritable storage medium such as a hard disc and a flash memory by downloading from a learning management server or a content server located at a distant place through the communication unit 14.

Each of the learning data memory unit 152 and the learning result memory unit 153 is one which stores different data with respect to each user, respectively, and may use a rewritable storage medium such as a RAM and a hard disc.

The information to be stored in the learning result memory unit 153 may be learning results of users and learning management information, and for example, in case of the word learning, comprises date of consulting a dictionary (hereinafter referred to as a registration date), a taken-out date, a master confirmation check column, a master date and the number of consulting a dictionary (registration).

A control unit 11 is a unit for carrying out functions of the information processing apparatus of the invention and realized by a so-called microcomputer comprising a CPU, a ROM, a RAM, a timer and an I/O controller. Each function of this apparatus is realized by the CPU controlling the display unit 12, the input unit 13, the memory unit 15 and the communication unit 14 based upon the learning program of the invention stored in the learning program memory unit 151.

<Structure of the Learning Management Server>

The learning management server 3 is a server which is connected through the Internet and realized as one function of a server owned by a provider and as shown in FIG. 1, has at least a control unit 31, a communication unit 32 and a memory unit 33.

The communication unit 32 has similar functions to those of the communication unit 14 of the information processing apparatus 1, and the control unit 31 is a unit for carrying out various functions for learning management and realized by a so-called microcomputer.

The memory unit 33 comprises a learning distribution management program memory unit 331 which stores a program for carrying out distribution and management of learning results of users, a learning user information memory unit 332 which stores user information to be used in distributing learning contents to the portable information terminal 4, a learning data memory unit 333 which stores content data with respect to each learning level at each portable information terminal 4 and a learning result memory unit 334 which stores learning contents and answers of users which are transferred from learning apparatus of the information processing apparatus 1 and the portable information terminal 4 as a result of learning of users thereat.

<Structure of the Portable Information Terminal>

The portable information terminal 4 has much the same structure as the information processing apparatus 1, but its memory capacity and size are smaller because of its portability. Accordingly, an LCD with small in size, light in weight and small electric power performance is used in a display unit 42, and a keyboard, a touch panel and a jog dial are used in an input unit 43, and a semiconductor memory of relatively small capacity such as a flash memory and an IC card is used in a memory unit 45.

The memory unit 45 has the same structure as the information processing apparatus 1 and comprises a portable use learning program memory unit 451, a portable use learning data memory unit 452 and a portable use learning result memory unit 453, each of which stores a learning program, data for use in learning and learning result, respectively, for use in a portable information terminal with small memory capacity.

<Structure of the Content server>

The content server 2 comprises a content data memory unit which stores learning contents to be provided, and a control unit and a communication unit which have the same functions as other components of the invention.

<Summary of the Learning Support System>

Figure 2:
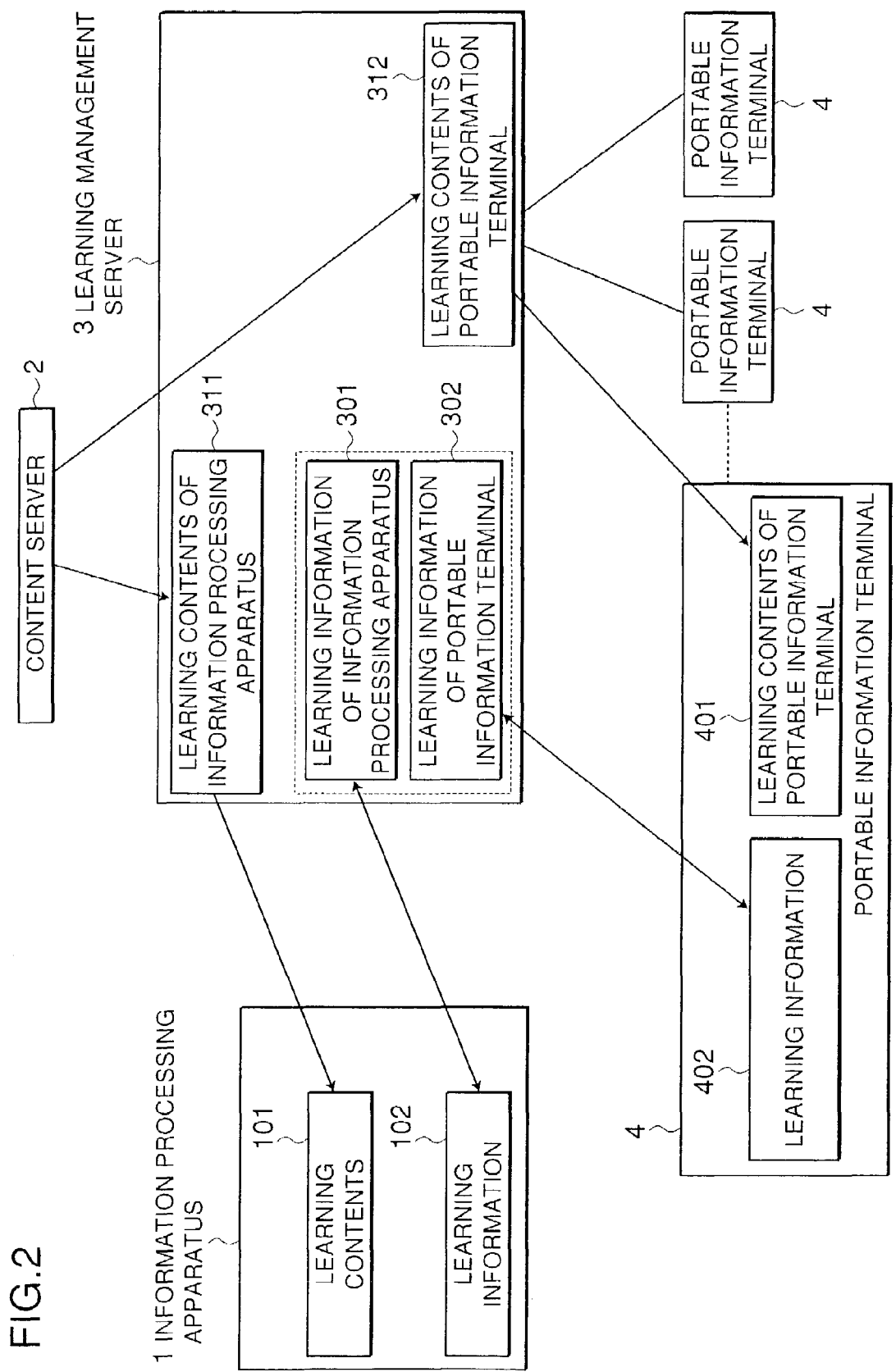
FIG. 2 is an explanation drawing of a process flow of the learning support system of the invention.

FIG. 2 shows a schematic explanation drawing of process flows of the learning support system of the invention.

Since a personal computer and the like are used as the information processing apparatus 1, various kinds of programs may be installed therein and a so-called learning apparatus is constructed by adding a learning program and learning data such as teaching materials for learning (test, dictionary) thereto.

Hereinafter, this learning program and learning data are collectively called as learning contents 101. A user may obtain this learning contents by purchasing a storage medium such as CD-ROM and also, by downloading it from the content server 2 of an education business owner through a network.

FIG. 2 shows a route for obtaining the learning contents through the learning management server 3. Here, the learning contents 311 may be stored in the learning management server 3.

It is possible to save capacity of the information processing apparatus 1 side in case that minimum structure of a program and a teaching material necessary for learning is downloaded to the information processing apparatus 1 from the learning contents 311 in the learning management server 3.

Further, in case that there are a plurality of the information processing apparatus 1, it is not necessary to download all of learning contents which are obtained from the content server 2 to all of the information processing apparatus 1, and it should be appreciated to download them only one portion of the learning management server 3 so that labor for initial installment may be saved and burden of users may be reduced. In case that the learning contents are stored in one portion of the learning management server 3, it should be appreciated to simply update the learning contents 311 in the learning management server 3 even in case that learning contents provided are updated.

Further, in case that there occurs a necessity for updating the learning contents 101 to be stored in the information processing apparatus 1 side, burden of users may be reduced if the learning management server 3 side is equipped with a function for automatically updating the learning contents 101 of the information processing apparatus side when the learning contents 311 of the server 3 are updated.

Further, in the information processing apparatus 1, as stated above, the learning information 102 such as contents which users have learned, answers of users, contents of wrong answers, the number of wrong answers or midway learning progresses (information about to what extent learning is completed) is stored in the memory unit 15 and this learning information is transferred to the learning management server 3. This transfer may be carried out on purpose based upon instruction inputs of users and also, may be carried out automatically after a predetermined operation of learning completion. The learning information transferred from the information processing apparatus 1 is stored as the learning information 301 in the memory unit 33 of the learning management server 3.

On the other hand, the portable information terminal 4 is also constructed as the learning apparatus, and its memory unit 45 stores a learning contents 401 and learning information 402. The learning contents of the portable information terminal 4 may be obtained from the content server 2 in the same manner as the learning contents of the information processing apparatus 1, and may be stored in the learning management server 3 (a learning contents 312).

Further, the learning information 402 such as learning results of the portable information terminal 4 is stored in the memory unit 33 of the learning management server 3 as the learning information 302.

Here, considered is a case that the learning information 102 is transferred to the learning management server 3 as the learning information 301 after a user carries out learning at the information processing apparatus 1. In this situation, in case that a portable information terminal A is connected to the learning management server 3 in order for the same user to carry out learning at the portable information apparatus 4, the learning information 301 which is stored in the learning management server 3 is downloaded to the portable information terminal A as the portable use learning information 402. Then, by use of this downloaded portable use learning information 402, a user carries out learning based upon the portable use learning program.

At this time, a user may continue to carry out learning by means of the portable information terminal 4, which has been done at the information processing apparatus 1 by use of the learning information 402 which contains learning results at the information processing apparatus 1 and therefore, even in case that learning is discontinued halfway, there occurs no constrain of time and place so that continuous learning is possible and learning efficiency may be improved.

Conversely, it is possible to carry out continuous learning at the information processing apparatus 1 by use of the learning information 402 and 302 which contain learning results at the portable information terminal 4 in case that the learning information 402 is transferred to the learning management server 3 after learning is carried out at the portable information terminal 4.

Further, in FIG. 2, explained is an embodiment in which the learning information to be stored in the learning management server 3 is stored separately as the learning information 301 and 302, but it may be stored as one learning information of a user without being separately stored in the learning management server 3.

In case that it is stored as one learning information in the learning management server 3, it is possible, after learning at the portable information terminal 4, to carry out continuous learning again at the portable information terminal 4 at different time and place.

Further, it is possible to carry out continuous learning with respect to each user in case that a plurality of users are registered in a learning user information memory unit 332 in advance. For example, considered is a case that three users A, B, C share the information processing apparatus 1 and carry out their learning by use of their own learning programs and further, have their own portable information terminals 4, respectively.

In this case, with respect to each user A, B, C, their own user information is stored in advance in the learning user information memory unit 332. The user information comprises, for example, a user name, contact information (such as a mail address of a portable information terminal and a telephone number of a portable phone) and learning level of a user.

Further, with respect to each user A, B, C, a learning program and learning data are stored in the learning contents 312 of the learning management server 3. Furthermore, with respect to each user A, B, C, the learning information 302 of the learning management server 3 is stored.

Then, in case that a user A, for example, connects his/her own portable information terminal 4 to the learning management server 3, it is controlled in such a manner that the learning contents 312 and learning information 302 for the user A himself/herself become available by the learning distribution program stored in the learning distribution management program memory unit 331.

At this time, it may be desinged to distribute different learning contents to the portable information terminal A of the user A according to learning level of the user A. As just described, in case that user information is managed by the learning management server 3, even in case that a plurality of users share the information processing apparatus 1 for carrying out different learning, their own learning may be carried out at their own portable information terminals 4, respectively.

Further, in case that learning is not carried out at the information processing apparatus 1 but test preparation is carried out there and then, transferred the test to the learning management server 3 as a learning information of every owner of the portable information terminals 4, the same test may be distributed to a plurality of owners of the portable information terminals 4.

In this case, for example, in case that the information processing apparatus 1 is located at a private cramming school and cram school students have portable information terminals 4, a simple learning system of one vs. n may be constructed. That is, it is possible to carry out a broadcast communication in which same test or notice of test is distributed to a plurality of cram school students for their preparation and review, and to do a central control of return mails by transferring learning information which contains learning results of plural cram school students based upon the same test to the learning management server 3.

<Learning Flow by Use of the Learning Support System>

Figure 3:
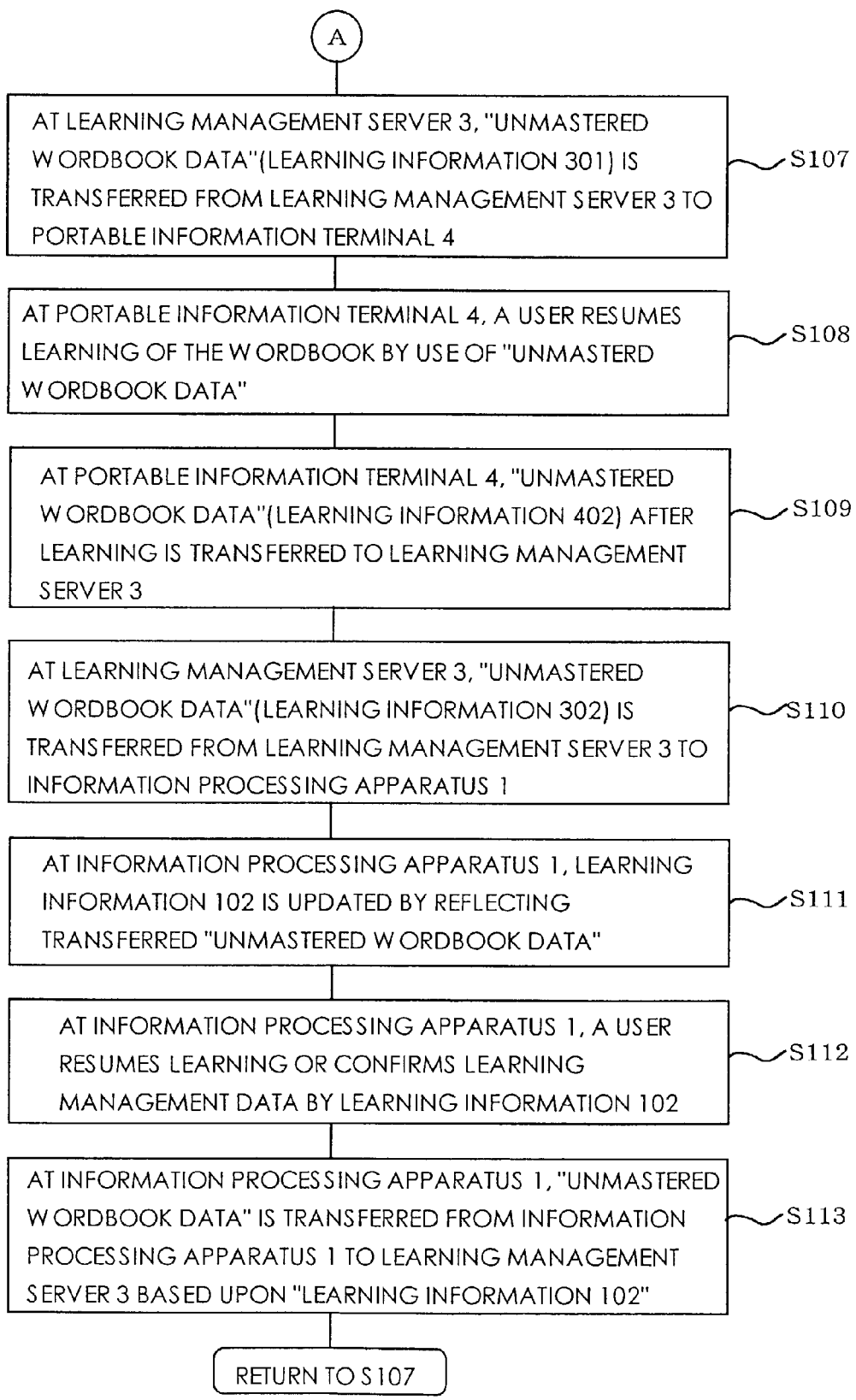
FIGS. 3(a) and 3(b) are flow charts of one embodiment of learning by use of the learning support system of the invention.

FIGS. 3(*a*) and 3(*b*) show flow charts of one embodiment of learning by use of the learning support system of the invention.

Here, explained will be a case that one user purchases "a wordbook program" and "a teaching material such as wordbook learning test" for learning a wordbook as the learning contents from a content provider which owns the content server 2 and then, carries out learning at the information processing apparatus 1 and thereafter, carries out continuous learning at the portable information terminal 4 of the user.

However, the learning contents are not limited to the above mentioned and as stated above, they may be learning contents necessary for learning such as technical jargons, a historical chronological table, geographic names, mathematical formulas and learning materials for qualifications. A server provided by a provider which users sign up or are under contract with may be treated as the learning management server 3 and the user may use the learning support function of the invention which is provided as one of functions of the server after user authentication.

Firstly, at a step S101, a content provider throws in "learning content" for wordbook learning to its content server 2.

At a step S102, a user purchases the thrown-in "learning content" for wordbook learning through a signed-up provider. The method for purchasing this time may be one which uses a electronic settlement system through the Internet and also, may be one by use of mail or sale at a shop without use of the Internet.

In case that the learning contents are purchased through a signed-up provider, the learning contents are downloaded as the learning contents (311, 312) from the content server 2 to the memory unit 33 of the learning management server 3 which the provider provides.

At a step S103, a control unit of the learning management server 3 transfers all or a part of the downloaded learning contents 311 to the information processing apparatus 1 in response to a request from the information processing apparatus 1 which is owned by the user who has purchased the learning contents.

Here, in case that a part of the learning contents 311 is transferred, it is set in advance in the learning contents 311 as to which portion should be transferred but it may be decided by an instruction from the information processing apparatus.

The transferred learning content is stored in the memory unit 15 of the information processing apparatus 1 as the learning contents 101.

On the other hand, all or a part of the learning contents 312 for use in a portable information terminal is stored in the same manner to the portable information terminal 4 which is owned by the user and stored in the memory unit 45 as the learning contents 401.

At a step S104, in order for a user to be able to use the "learning content" which has been transferred to the information processing apparatus 1, the user carries out a work for installing it to the information processing apparatus 1 and setting thereof and builds them in such a manner that the learning program and learning data are usable. That is, by this work, the information processing apparatus 1 is constructed in such a manner that it functions as a learning apparatus for a wordbook.

At a step S105, a user carries out learning of a wordbook by use of the learning contents built in the information processing apparatus 1. It is possible to design in such a manner that this learning itself is carried out in the information processing apparatus by itself and the learning management server 3 does not engage in directly. Further, in case that only a part of the learning contents is transferred, learning may be carried out by acquiring data as required by communicating with the learning management server 3.

FIG. 4 shows one embodiment of a display screen which is displayed on the display unit 12 of the information processing apparatus 1 in execution of wordbook learning.

In case that a user discontinues learning halfway, at a step S106, the learning information 102 which is stored in the learning result memory unit 153 at the time of such discontinuing, i.e., "unmastered wordbook data" is transferred by the control unit of the information processing apparatus 1 to the learning management server 3. This "unmastered wordbook data" is stored in the memory unit 33 of the learning management server 3 as the learning information 301 of the information processing apparatus shown in FIG. 2.

At a step S107, the learning management server 3 transfers the unmastered wordbook data 301 to the portable information terminal 4 of the user. The portable information terminal 4 stores the data transferred thereto as the learning information 402.

At a step S108, a user resumes learning of a wordbook continuously at the portable information terminal 4 by use of the learning information 402 transferred thereto, i.e., the learning content at the state of once discontinuing at the information processing apparatus 1.

Figure 5:
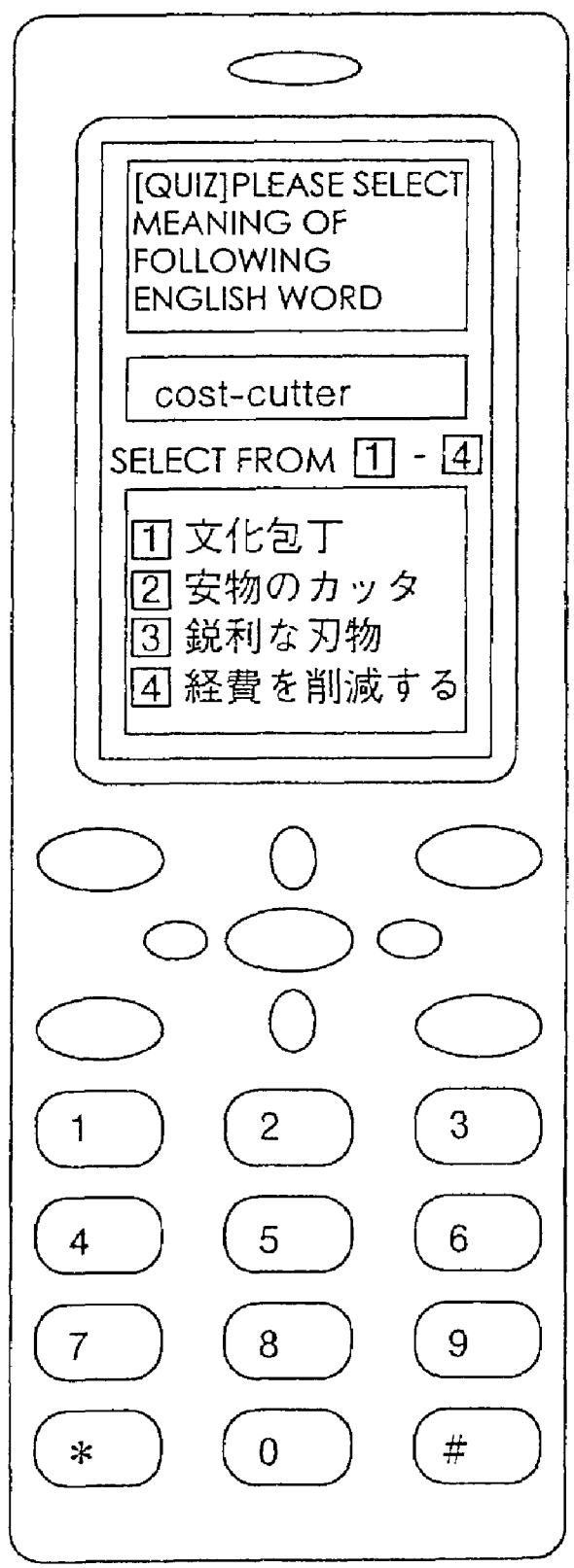
FIG. 5 is a drawing which shows a display screen of one embodiment in execution of wordbook learning in the portable information terminal of the invention.

FIG. 5 shows one embodiment of a display screen which is displayed on the display unit 42 in execution of wordbook learning at the portable information terminal 4.

A user may carry out continuous learning, without limitation of time and place, even in transit but not at a fixed place such as his/her own home.

In case that a user completes or discontinues the wordbook learning at the portable information terminal 4, at a step S109, the learning information 402 as "unmastered wordbook data" at the time of such completion or discontinuing is transferred to the learning management server 3. The learning management server 3 stores this learning information 402 as the learning information 302 of the portable information terminal.

Then, at a step S110, in order to resume learning at the information processing apparatus 1 at home or to take learning results at the portable information terminal 4 in the information processing apparatus 1, a user connects the information processing apparatus 1 to the learning management server 3 and downloads the learning information 302 of the portable information terminal to the information processing apparatus 1.

At a step S111, contents of the learning information 302 is reflected on the learning data memory unit 152 and the learning result memory unit 153 of the memory unit 15 of the information processing apparatus 1 and the learning information 102 such as the number of learning, and correct and wrong answers is updated.

At a step S112, by use of such updated learning information 102, a user resumes learning or confirms learning management data such as percentage of learning completion. In case that learning is resumed, in order to further carry out continuous learning at the portable information terminal 4, the learning information 102 after learning is resumed may be transferred to the learning management server 3 (step S113).

After the step S13, for example, in case of returning to the step S107, learning may be continued.

According to the above processing of the embodiment, even in case that a user discontinues learning halfway, continuous learning is possible by use of the information processing apparatus 1 and the portable information terminal 4 without any constraint of time and place so that effective learning to the user is possible.

Further, at steps S106, S107, S109, S110 and S113 in the processing of FIGS. 3(a) and 3(b), learning information is transferred to or brought out from the learning management server 3, but in case that learning information stored in the learning management server 3 is updated as a result of access to the learning management server 3 like this, it may be possible for a provider who owns the learning management server 3 to toll fees of predetermined amount. In the same manner, in case that the learning contents such as the learning program and learning data is updated or in case that learning is carried out by connecting to the learning management server, it may be possible for a provider who owns the learning management server to toll fees.

Feature 1 of Other Embodiments

The foregoing embodiment shows a case in which the learning contents purchased from the content provider are transferred to the information processing apparatus 1, and learning is carried out at the information processing apparatus 1 and thereafter, such learning is continued at the portable information terminal 4. It may be possible that conversely, such learning is continued at the information processing apparatus 1 after learning initially at the portable information terminal 4.

Feature 2 of Embodiments

Further, there may occur a case in which normally, learning is carried out by only use of the portable information terminal 4, the learning information including new learning results at the portable information terminal is always stored in the learning management server 3 and such information is reflected on next learning at the portable information terminal 4 to thereby continue such learning. In this case, a function for automatically transferring the learning information 302 of the portable information terminal stored in the learning management server 3 to the information processing apparatus 1, regularly, for example, every one day, every one week, or every one month may be added to the learning management server 3.

Feature 3 of Embodiments

Further, in case that a user regularly purchases "news content" from a provider, when the news content is transferred to the information processing apparatus 1 by mail, the news content may be taken in as a part of learning data and used for learning at the information processing apparatus 1 and the portable information terminal 4.

For example, in case that the news content contains English sentences, such English sentences may be taken in as a part of wordbook learning data and thereby, learning tests with rich variation may be prepared.

Furthermore, it may be possible to prepare illustrative sentences or information necessary for learning as wordbook learning data by means that a user himself/herself inputs characters at the information processing apparatus 1 or at the portable information terminal 4. By this, learning test is prepared based upon information that a user himself/herself has inputted by his/her own intention so that effective learning to the user is possible.

2. Concrete Structure of the Information Processing Apparatus and Embodiment of Learning Processing Hereinafter, concrete structure of the information processing apparatus 1 and one embodiment of learning processing will be described. Here, the information processing apparatus 1 is called as a learning apparatus.

The present invention further provides an information processing apparatus comprising an input unit for inputting characters and marks, a display unit for displaying a text, an information memory unit comprising first information of index words and second information associated with the index words, a search unit for searching the information memory unit by an index word which is inputted from the input unit, a temporary storage unit for storing the second information associated with the index word which is searched by the search unit, a data acquiring unit for acquiring data necessary for learning in the second information stored in the temporary storage unit, a file preparation unit for preparing a search information file which includes data acquired by the data acquiring unit and the inputted index word, and a test preparation unit for preparing a test by use of the search information file prepared by the file preparation unit.

Here, in case that the first information is an index of a word, the data acquiring unit may acquire head translation of each acceptation or head translation of head acceptation which is included in the second information associated with the searched index word.

The data acquiring unit may acquire a sentence which includes the inputted index word in the text displayed on the display unit.

The information processing apparatus may further comprise a learning information preparation unit for preparing a learning information file to prepare a test for learning. The learning information preparation unit prepares a learning information file which includes at least an index word, data acquired by the data acquiring unit, and the number of searches for the index word with regard to the index word which is included in the search information file, and in case that the index word is already included in the learning information file, the number of searches may be updated.

Further the learning information file may include master information which is given based upon master instruction inputted from the input unit with respect to each index word and its master date, and in case that an index word which is already registered in the learning information file and to which master information is given is searched by the search unit, the learning information preparation unit may delete master information which corresponds to the index word from the learning information file, and an alarm which shows that the index word has already mastered may be displayed on the display unit.

the information processing apparatus may further comprise a taken-out information setting unit for setting a criterion which determines information to be taken out from the search information file, and an information selecting unit for selecting information to be taken out based upon the criterion which is set by the taken-out information setting unit.

According to this invention, it is possible to easily acquire information necessary for learning without any burden to users and to provide a learning apparatus by which effective learning to its user is possible.

Hereinafter, this invention will be described in detail based upon embodiments shown in the drawings.

In following embodiments, explanation will be carried out supposing that the above-stated temporary storage unit corresponds to a dictionary data file (FIG. 4), an area for storing data necessary for learning which is acquired by a data acquiring unit corresponds to a wordbook storage buffer (FIG. 5), a search information file corresponds to a search word file (FIGS. 3(a) and 3(b)), and a learning information file corresponds to a wordbook file (FIG. 6, FIG. 7), respectively.

Further, an information memory unit means whole of a so-called electronic dictionary and comprises index words and information associated with the index words (such as meanings, word class, and illustrative sentences) and information searched from this electronic dictionary is prepared as a dictionary data file. Furthermore, a search unit, a data acquiring unit, a file preparation unit and a test preparation unit are realized as one function of the control unit shown in FIG. 1.

The number of search means, for example, the number of consulting an electronic dictionary by a user as to a certain index word and also the number of registration in the search information file, and in following embodiments, corresponds to "Frequency of Appearance". Further, updating the number of search means to add one (1) to the current number of search.

Master information means information which shows that a certain index word is mastered by a user and means that, in case of an English word as an index word, memorization of Japanese meaning of the English word is completed. For example, the master information is a mark like "◎" and in case that a user determines that it is mastered, such master information is given to each index word by intention of the user.

Figure 6:
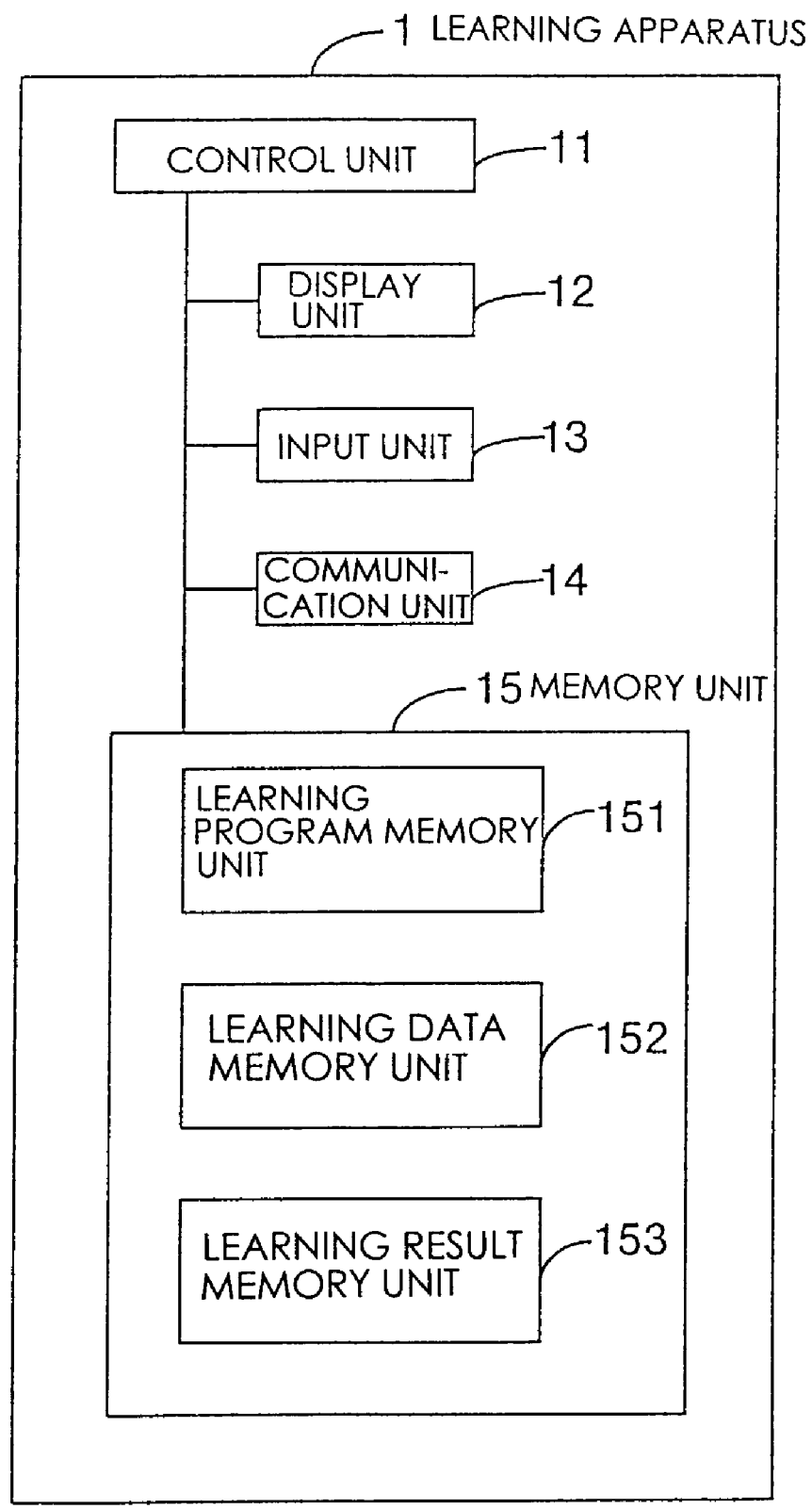
FIG. 6 is a structural block diagram of one embodiment of the learning apparatus of the invention.

FIG. 6 shows a structural block diagram of one embodiment of the learning apparatus of the invention.

Here, explanation will be carried out as to a case that learning of English words and sentences using such English words is carried out as the learning apparatus. However, this case is not limitative and the invention is also applicable to learning of technical terms such as computer terms and legal terms.

Further, the learning apparatus of the invention may be realized as a stand-alone apparatus and also realized by installing an exclusive application program as one function of an electronic dictionary available in the market, or in a desktop personal computer, a notebook type personal computer and a portable information terminal such as a PDA, or in information equipment with various features such as a portable phone having data communication function.

Various display devices such as an LCD, an EL and a CRT may be used as the display unit 12 which visually displays information used for learning to users.

Various input devices such as a keyboard, a mouse, a touch panel, a track ball and a pen may be used as the input unit 13 which, other than those devices, may have an additional function which is capable of various inputs such as various characters, signs and voices like a handwritten character input and buttons of a portable phone.

While the communication unit 14 is not essential for learning a word, it is used in the case that a word to be learned is obtained through communication from a content provider or other external servers, or a learning problem or result is subjected to two-way communication.

Accordingly, the communication unit 14 has a wireless communication function such as wireless LAN and Bluetooth and a network connecting function such as a telephone line, an Ethernet LAN, ISDN and ADSL.

The memory unit 15 may be a semiconductor memory such as ROM and RAM, a memory device such as an IC card and a hard disc and a movable memory medium such as a CD-R/CD-RW, MO and MD.

The memory unit 15 comprises a learning program memory unit 151 for storing a learning program which realizes each function of the learning apparatus of the invention, a learning data memory unit 152 for storing information by which a user learns words etc. (wordbook data, illustrative sentences and quiz sentences) and a learning result memory unit 153 for storing the learning result of the user.

Here, it is preferable to use a read only semiconductor memory such as ROM as the learning program memory unit 151 but a rewritable RAM and an IC card may be used to change a learning object.

Further, the learning program may be stored in a rewritable storage medium such as a flash memory by downloading from a learning management server or a content provider located at a distant place through the communication unit 14.

Each of the learning data memory unit 152 and the learning result memory unit 153 is one which stores different data with respect to each user, respectively, and may be a rewritable storage medium such as a RAM and a hard disc.

The information to be stored in the learning result memory unit 153 may comprise, for example, date of consulting a dictionary (hereinafter referred to as a registration date), a taken-out date, a master confirmation check column, a master date and the number of consulting a dictionary (registration), as described below.

The control unit 11 is an unit for carrying out functions of the learning apparatus of the invention and realized by a so-called microcomputer comprising a CPU, a ROM, a RAM, a timer and an I/O controller. Each function of the learning apparatus is realized by the CPU controlling the display unit 12, the input unit 13, the memory unit 15 and the communication unit 14 based upon the learning program of the invention stored in the learning program memory unit 151.

A function for acquiring data for learning in this invention will be described.

Figure 7:
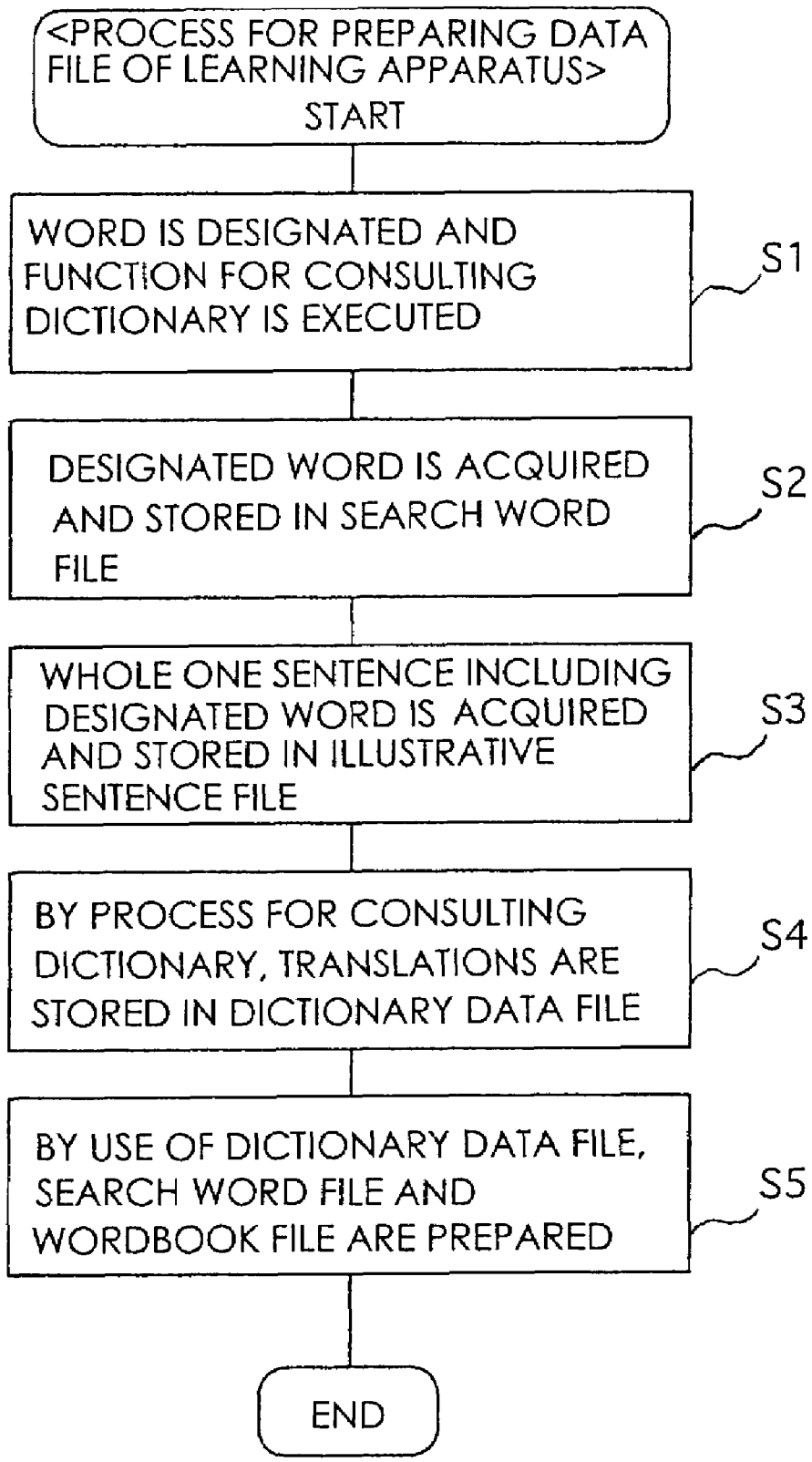
FIG. 7 is a schematic flow chart of data file preparation function of the learning apparatus of the invention.

FIG. 7 shows a schematic flow chart of data file preparation function of the learning apparatus of the invention.

Here, explained is a case that, under such a situation that an English sentence is displayed on the display unit 12, a user reads the English sentence or translates it.

Firstly, in case that a user finds an English word as to which he/she wish to know Japanese meaning in an English sentence displayed on the display unit 12, a function for consulting a dictionary is executed by designating the English word (step S1).

Then, the designated English word is stored as an index word in the "search word file" (step S2).

FIG. 8 shows a content of one embodiment of the "search word file" in the invention.

For example, in case that a user designates a portion of "pen" in the displayed sentence of "This is a pen" and then, the portion is reverse-displayed and thereafter, the user pushes a predetermined key, a program of a function for consulting a dictionary is executed and as shown in FIG. 8, "pen" is stored in the search word file as an index word.

The search word file comprises index words, translations, word class and registration dates but is not limited to them. It may be possible to register information necessary for learning at the same time.

Then, at a step S3, whole of one sentence including the designated word is acquired and stored in the "illustrative sentence file".

For example, a sentence of "This is a pen" including the designated word, "pen" is stored in the illustrative sentence file.

Further, at a step S4, by a process for consulting a dictionary which picks out translation corresponding to an index word, information relating to the index word is stored as the "dictionary data file".

For example, as to the index word "pen", information shown in FIG. 9 is stored.

Here, <見> and <品> are abbreviations of information contents shown thereafter and a mark of </> shows a break point of completion of the information contents.

For example, <見> is an abbreviation which shows that an index word is shown thereafter.

<品>,<訳>, <用英>, and <用訳> are abbreviations which show a word class, a translation, an example of an English sentence and a translation of the example of the English sentence, respectively.

Then, at a step S5, by use of the "dictionary data file" of FIG. 9, minimum structure of the search word file and the wordbook file used for learning is prepared.

Figure 10:
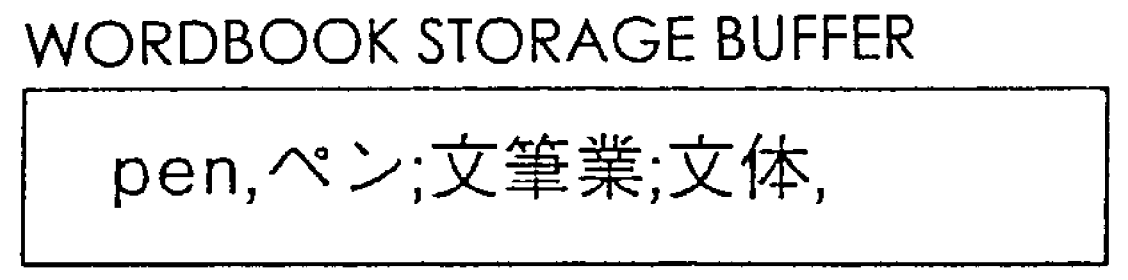

FIG. 10 shows one embodiment of contents of the "wordbook storage buffer" before the wordbook file is prepared.

FIG. 10 shows one picked up a head portion of translation <訳> in the "dictionary data file" relating to pen shown in FIG. 9.

That is, "ペン", "文筆業" and "文体" following <訳>1, <訳>2 and <訳>3 are picked out and cited behind the index word, "pen".

In case that there is an instruction for registering contents of this "wordbook storage buffer", contents of translation is registered in the "search word file" shown in FIG. 8 together with a word class to the index word and registration date.

Thereafter, the program having a function for updating wordbook preparation is executed and the wordbook file as shown in FIG. 12 is prepared.

In FIG. 12, "taken-out date" means a date when an index word is taken out for learning and "taken out" means that an index word, its translation and related information are stored in a movable type memory such as an IC card and taken out to other information terminal or a learning server through a network.

A "check column" is a column which shows whether the word is already mastered (completion of memorization) or not, in case that "◎" is given, it means to be mastered, and its master date is stored in the master date column.

In case that there is no registration in the check column, it shows that it is not yet mastered and means that it is a word to be presented as a test for learning. The "frequency of appearance" means the number of search such as consulting a dictionary by a user.

FIG. 11 shows one embodiment of the wordbook file in the invention and shows the wordbook file before the wordbook of FIG. 12 is prepared by use of the "search word file" of FIG. 8.

Process for updating wordbook file preparation will be described later but in case that three words shown in FIG. 8 are tried to be newly registered under the situation shown in FIG. 11, "ball" and "pen" are already registered so that the frequency of appearance is updated by adding one (1) and "desk" is registered as new registration so that the frequency of appearance is set to be one (1).

The foregoing is the schematic flow chart of the data file preparation function in the invention and the prepared search word file and wordbook file are brought over to a program for preparing a test for learning. In the learning test preparation program, appropriate tests are automatically prepared in an appropriate order by use of the information stored in the wordbook file and presented to users.

Them one embodiment of a process for acquiring the illustrative sentence file shown in the step S3 (shown in FIG. 7) will be described.

Figure 13A:
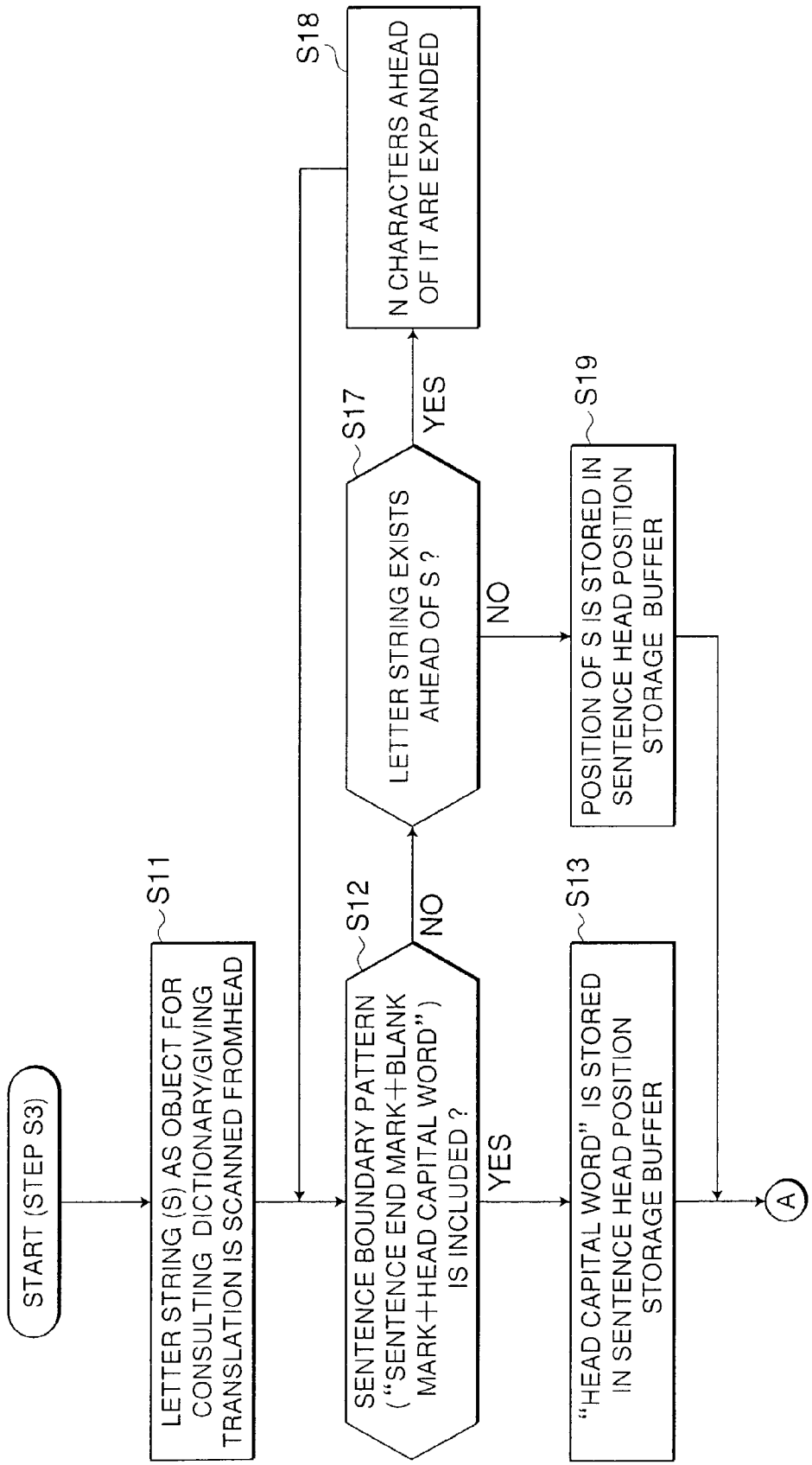
FIGS. 13(a) and 13(b) are flow charts of a process for acquiring an illustrative sentence file (step S3 in FIG. 7) in the invention.
Figure 13B:
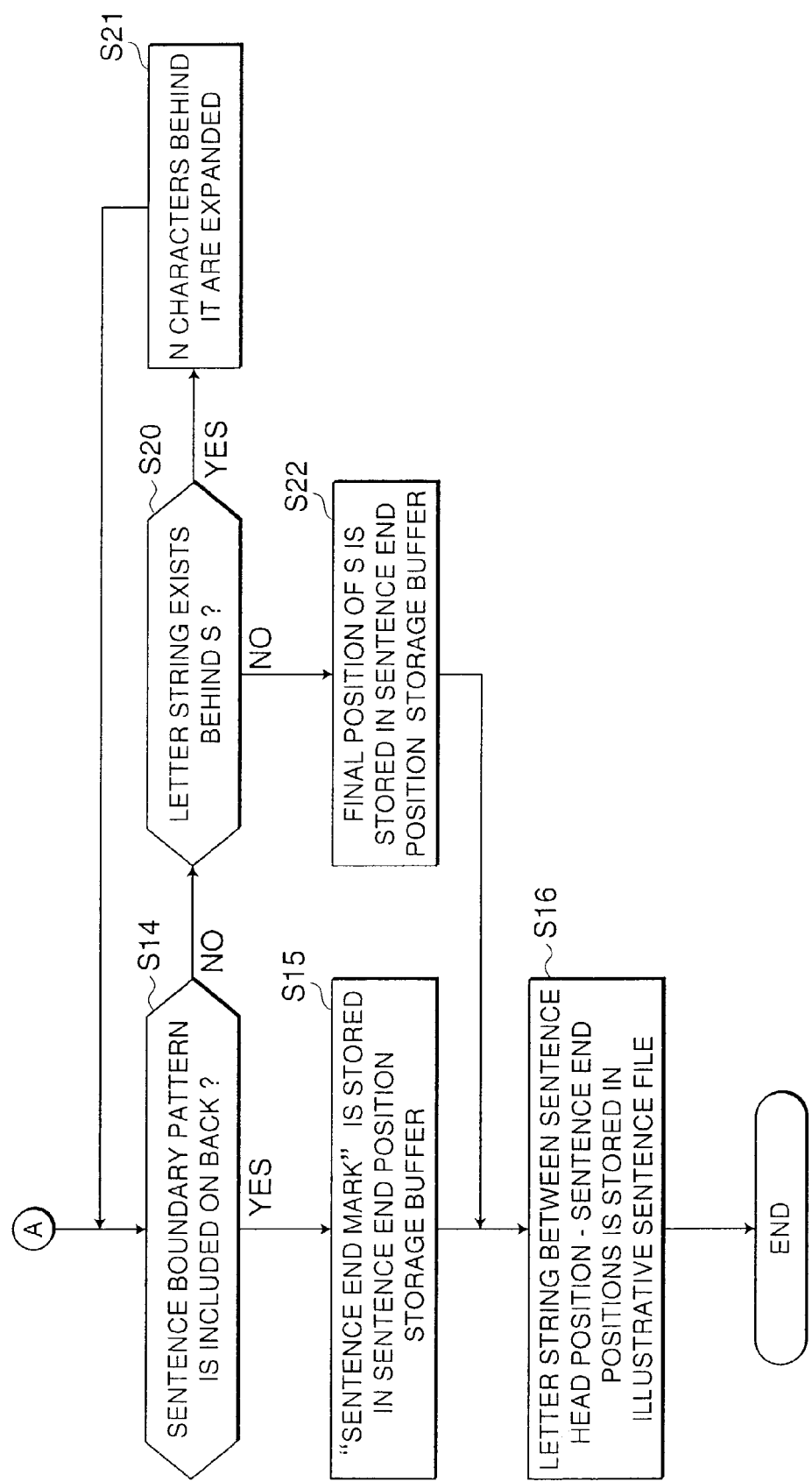

FIGS. 13(a) and 13(b) show flow charts of the process for acquiring the illustrative sentence file in the invention.

In case that the flow chart of FIGS. 13(a) and 13(b) are executed, for example, as shown in FIG. 14, a sentence "It translates English sentences into appropriate Japanese." which contains "appropriate" as an object for consulting a dictionary is acquired as an illustrative sentence for "appropriate" and stored in the illustrative sentence file.

In FIGS. 13(a) and 13(b), a letter string as an object for consulting a dictionary or for giving a translation (hereinafter, referred to as letter string S, "appropriate" in FIG. 14) is scanned in sequence from a top of a sentence displayed on the display unit 12 (step S11).

Then, it is checked whether or not a sentence boundary pattern is included in a letter string as an object for consulting a dictionary or for giving a translation (step S12).

The sentence boundary pattern is one in which a pattern showing a boundary between sentences is set to be registered in advance since such patterns are predetermined to some extent. For example, in case of an English sentence, the pattern comprises combination of "sentence end mark"+ "blank"+"head capital word". Here, "sentence end mark" is, for example, period (.), ? and !.

Further, in case of a Japanese sentence, the "sentence end mark (. , ? or !)" may be used as the sentence boundary pattern.

The sentence boundary patterns are stored in a sentence head position storage buffer. The sentence head position storage buffer is a memory which stores temporarily the sentence boundary pattern at the beginning of the sentence which was found at the time of scanning.

Then, in case that the sentence boundary pattern is not included, routine goes to a step S17 and it is checked whether or not there is a letter string ahead of the letter string S.

Then, in case that there is a letter string, a portion of N letters ahead of the letter string S is expanded (step S18) and the routine returns to the step S12.

Here, "expand" means that a letter string as an object for consulting a dictionary or for giving a translation is acquired and then, a letter string adjacent to a letter string which a user reversed initially is further acquired.

In case that there is no letter string ahead of the letter string S at a step S17, since the letter string S is a head of a sentence, the routine goes to a step S19 and the position of the letter string S is stored in the sentence head position storage buffer and the routine goes to the step S14.

In case that a sentence boundary pattern is included in the sentence head position storage buffer at the step S12, a head capital word in the sentence boundary pattern is stored in the sentence head position storage buffer (step S13).

In the sentence shown in FIG. 14, a capital word "It" is stored at a portion of "program. It".

Then, at the step S14, it is checked whether or not a sentence boundary pattern is included behind the "head capital word" which was judged at the step S13.

In case of absence of the sentence boundary pattern, it is checked whether or not there is a letter string behind the letter string S (step S20).

In case of presence of the sentence boundary pattern, the routine goes to a step S21 and a portion of N letters in the letter string located behind is expanded (step S21) and the routine returns to the step S14.

In case that there is no letter string at the step S20, a final position of the letter string S is stored in a sentence end position storage buffer (step S22) and the routine goes to the step S16. Here, the "sentence end position storage buffer" is a memory which stores temporarily information of a sentence end position acquired (for example, period, ?, !).

In case that a sentence boundary pattern is included at the step S14, the routine goes to the step S15 and a "sentence end mark" is stored in the sentence end position storage buffer. In the sentence shown in FIG. 14, the period behind "Japanese" is stored. Then, a letter string located between the sentence head position storage file and the sentence end position storage file is stored in the illustrative sentence file (step S16).

In the sentence shown in FIG. 14, "It" of sentence head and period of sentence end (period of "Japanese.") are picked out over expanding each N letters ahead of and behind "appropriate" and a letter string between them is judged as one sentence so that a sentence "It translates English sentences into appropriate Japanese." is acquired.

By the above-stated process, a sentence including a word (appropriate) which was subject to consulting a dictionary is picked out and stored as an illustrative sentence and this illustrative sentence is used as a test sentence in case of learning. Generally, there are many cases that reference illustrative sentences which are stored in a dictionary in advance and ones which are prepared by a test master independently in advance are used as test sentences in case of learning.

However, since there is high possibility that a sentence including a word that a user picked up by consulting a dictionary on his/her own free will is a word that the user once looked at and striked the user, it is considered to be able to improve learning efficiency in case that a sentence including a word that a user himself/herself picked up by consulting a dictionary is presented as an illustrative sentence for learning rather than presenting a reference sentence of a dictionary.

Then, a process for preparing a wordbook file shown at the step S5 in FIG. 7 will be described.

By carrying out this preparation process, the search word file shown in FIG. 8 and the wordbook file shown in FIG. 12 are prepared from the dictionary data file shown in FIG. 9.

Figure 15:
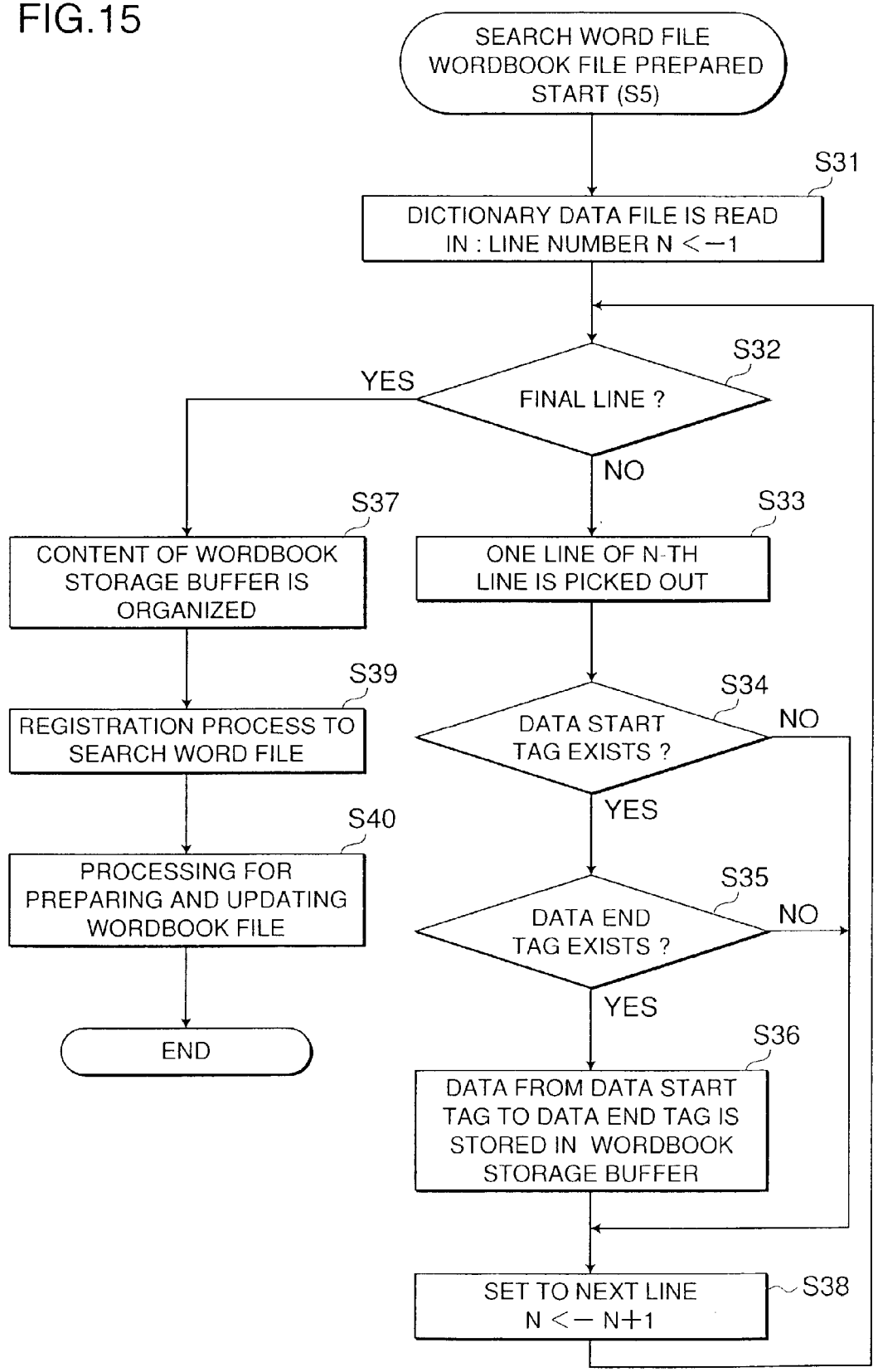
FIG. 15 is a flow chart of a process for preparing a wordbook file etc. (step S5 in FIG. 7) in the invention.

FIG. 15 shows a flow chart of processing for preparing the wordbook file in the invention shown in the step S5.

Firstly, at a step S31, contents of the dictionary data file are read out to a memory area for work. Here, variable n which shows the number of lines is initialized to 1.

Then, at a step S32, it is checked whether or not n-th line which is focused in the dictionary data file is a final line. In case that it is not a final line, the routine goes to a step S33 and only one line portion of the n-th line which is focused is picked out.

It is checked whether or not a "data start tag" exists as to one line picked out (step S34).

Here, the "data start tag" is a preset tag in advance and for example, <訳> shown in FIG. 9 is set to be a start tag.

In FIG. 9, there exists no <訳> in first and second lines and it is confirmed that it exists in a third line.

In case of absence of the "data start tag", n+1 is set to n in order to confirm a next line (step S38) and the routine returns to the step S32.

In case of presence of the "data start tag", the routine goes to a step S35 and it is checked whether or not "data completion tag" exists (step S35). Here, the "data completion tag" is a preset tag in advance and for example, </> shown in FIG. 9 is set to be a completion tag.

In case of absence of the completion tag, the routine goes to a step S38.

In case of presence of the completion tag, the routine goes to the step S36 and data located between the data start tag and the data completion tag is stored in the wordbook storage buffer and the routine goes to a step S38. For example, since there exists the data completion tag at a third line, data of <訳>1 ペン[万年筆・ボールペン]</> is stored in the wordbook storage buffer.

Such processing of the steps from the step S32 through S38 is repeated and thereafter, at the step S32, in case that it is judged to be a final line, the routine goes to the step S37 and contents of the wordbook storage buffer are organized.

Organizing the contents of the wordbook storage buffer means that only information necessary as a wordbook data is picked out.

Considering the dictionary data file shown in FIG. 9, data located between <訳> as the data start tag and </> as the data completion tag is picked out and the following three words are stored in the wordbook storage buffer.

<訳>1 ペン[万年筆・ボールペン]</>
<訳>2 文筆業、ペン;</>,
<訳>3 文体;文筆の才</>

Here, all information stored may be used as the wordbook data for learning, but one which only necessary data to a user is picked out such as only head translations (ペン,文筆業,文体) in each acceptation or only a head acceptation of a head acceptation (ペン) may be used as the wordbook data. Limiting information quantity as stated above is effective in case of a portable terminal which has a small memory capacity.

Then, at the step S37, in case that only head acceptation in each acceptation is picked out and organized, information (pen, ペン;文筆業;文体) as shown in FIG. 10 is stored in the wordbook storage buffer.

Then, at the step S39, carried out is a process for registering contents of this wordbook storage buffer to the search word file. Here, registered are "translation", "word class" and "registration date" with regard to the index word (pen) which was the object for search.

Further, at a step S40, the wordbook file shown in FIG. 12 is prepared and updated by use of the contents of the search word file.

Here, in case that the prepared wordbook file has already existed, considering the contents, in case of a new index word, it is added and in case of the already stored index word, one (1) is added to the column of frequency of appearance.

Figure 16A:
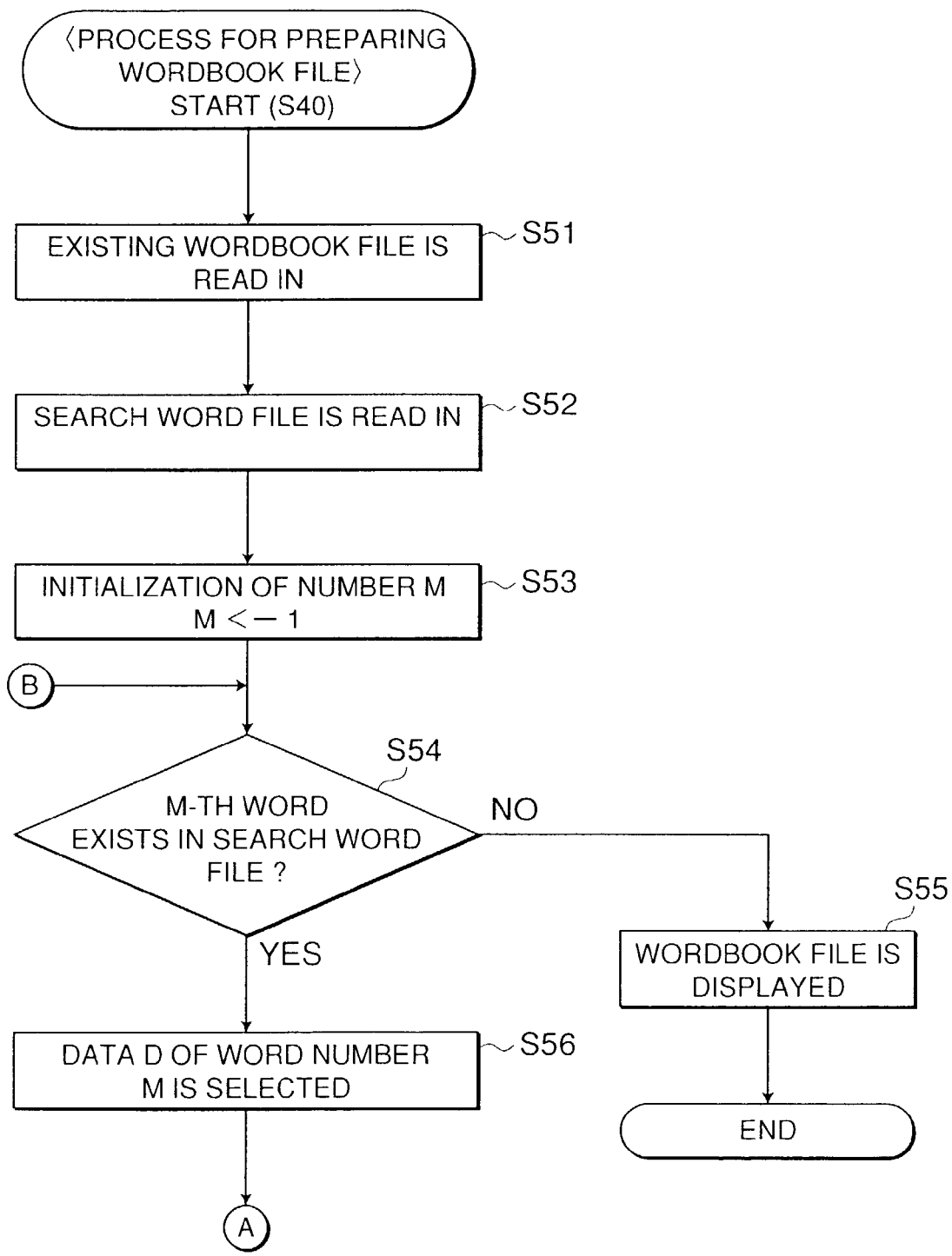
FIGS. 16(a) and 16(b) are detailed flow charts of a process for updating preparation of a wordbook file (step S40 in FIG. 15) in the invention.
Figure 16B:
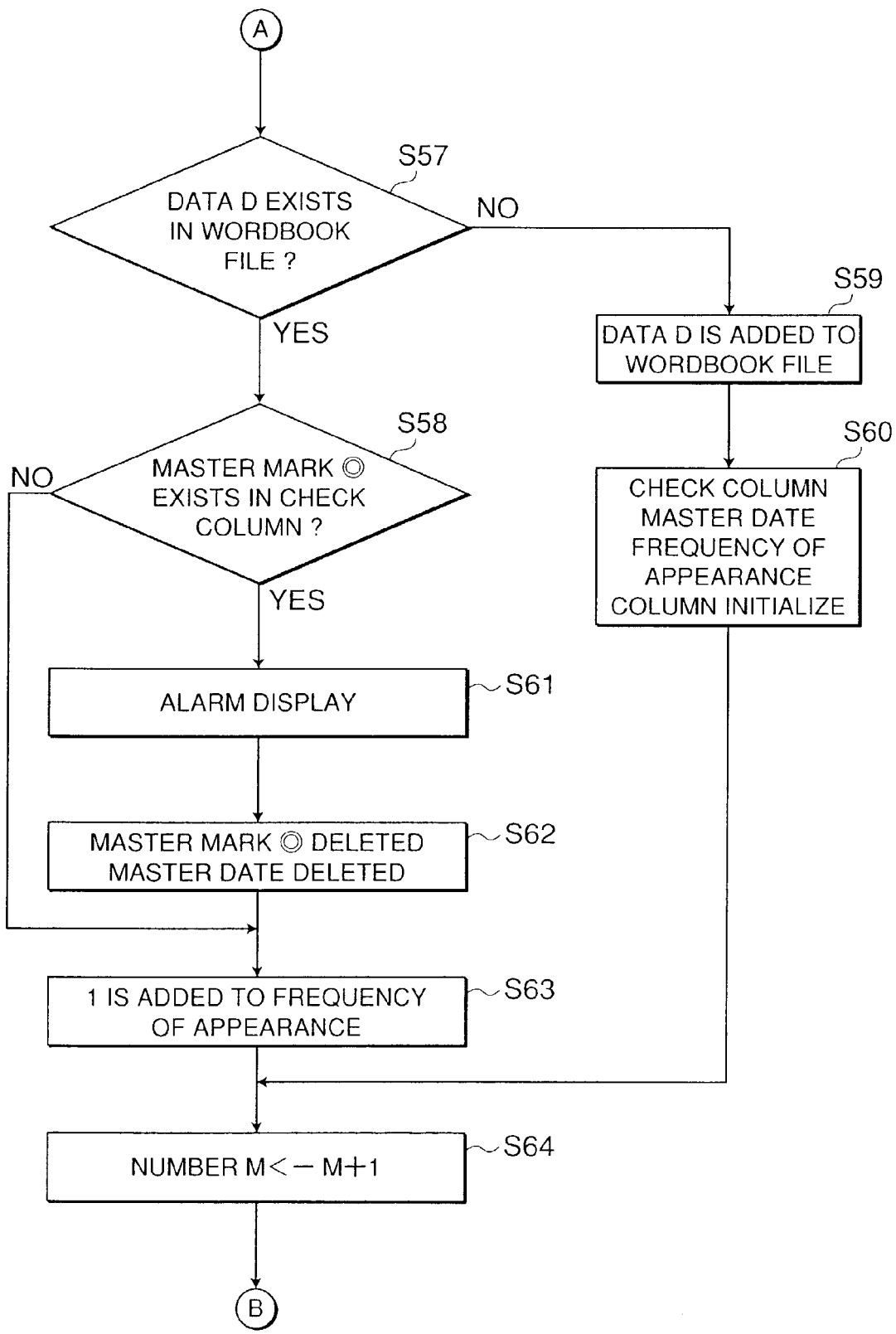

FIGS. 16(a) and 16(b) show detailed flow charts of process for preparing and updating the wordbook file at the step S40.

By this process, the wordbook file shown in FIG. 12 is prepared or updated.

Firstly, at a step S51, the existing wordbook file is read in a work memory area of the control unit 11.

The wordbook file is stored in the memory unit 15 of the learning apparatus of the invention or may be downloaded to the memory unit 15 from a transportable type memory such as an IC card or a server or other information terminal through a network.

Incidentally, in case that even one word is not registered in the wordbook file, there is no content to be read in but by process after a step S54, a wordbook file is newly prepared. In the following embodiment, the wordbook file shown in FIG. 11 is read in.

At a step S52, the search word file shown in FIG. 8 is read in the work memory area of the control unit 11. Here, a word list that a user newly searched is stored in the search word file.

At a step S53, the number m is initialized in order to count words in the search word file one by one. Here, m=1.

Then, at a step S54, it is checked whether or not m-th word exists in the search word file. In case of absence of the m-th word, the routine goes to a step S55 and the wordbook file is displayed and then, the process is completed. For example, in FIG. 8, there exist three (3) words and in case of m=4, the wordbook file is displayed and then, the process is completed. Further, in case of absence of any words in the search word file, the process is completed in the same manner.

At the step S54, in case of existence of the m-th word, the routine goes to a step S56 and data D of word number m is selected. For example, in case of m=1, "index word"="ball" in FIG. 8 is selected as the data D.

Then, at a step S57, it is checked whether or not the data D exists in the wordbook file.

Here, it is checked whether or not the same words as "index word", "translation" and "word class" in the search word file exist in the wordbook file.

In FIG. 8, in case of m=1, it is checked whether or not there exists a word which coincides with data of "ball", "ボール;球技", "noun" in the wordbook file shown in FIG. 11. In case of absence of the data D, the routine goes to a step 59 and the data D is added to the wordbook file to be newly registered. Further, a check column corresponding to the data D of the wordbook file and columns of master date and frequency of appearance are initialized (step S60).

As to the "ball" as the above-stated data D, it is not existed in FIG. 11 and so, newly registered in the wordbook file by the process of the step S59.

After this registration, index word, translation, word class and registration date relating to the word "ball" are added to the wordbook file as shown in FIG. 12.

Further, by the initialization at a step S60, "no mark" is set in the check column, "no input" is set in the master date, and one (1) is set in the frequency of appearance.

After the step S60, the routine goes to a step S64 and the number m is increased by one (1) in order to check a next word and then, the routine returns to the step 54.

At the step S57, in case that the data D exists in the wordbook file, the routine goes to the step S58 and it is checked whether or not there is a master mark "◎" in the check column of the data D in the wordbook file.

In case of absence of the master mark ◎, the routine goes to the step S63 and one (1) is added to the frequency of appearance of the data D.

That is, the frequency of appearance is counted up as consulting a dictionary is newly carried out as to the data D, which means that necessity for learning is one rank upgraded.

For example, in the search word file of FIG. 8, data D as an object to be searched is "boy" in case of m=2, but since data of the index word "boy" has already existed in the wordbook file of FIG. 11 and no master mark exists in the check column, by the steps S58 and S61, one (1) is added to the frequency of appearance so that the frequency of appearance of "boy" becomes two (2) as shown in FIG. 12.

Further, at the step S58, in case of presence of the master mark ◎, the routine goes to the step S61 and an alarm display is shown. The reason that the alarm display is shown is that an operation for consulting a dictionary is carried out regardless of the existing master mark and there is a possibility that the master level is not enough.

The alarm display may be carried out in such a manner that for example, the message of "An operation for consulting a dictionary is carried out although a user says that it is already memorized. The memorized check is canceled." is displayed on the display unit.

Then, the routine goes to the step S62 and the master mark ◎ of this data D is deleted and the master date is also deleted. Further, at the step S63, one (1) is added to the frequency of appearance.

For example, in the search word file of FIG. 8, data D as an object to be searched is "pen" in case of m=3, but since data of the index word "pen" has already existed in the wordbook file of FIG. 11 and the master mark ◎ exists in the check column, by the processes of the steps S58, S61, S62 and S63 as shown in FIG. 12, the check column of the index word "pen" and the master date become blank and the frequency of appearance becomes two (2).

As stated above, with regard to all words in the search word file, the wordbook file is prepared or updated and the wordbook file is displayed on the display unit by the step S55. The display of the wordbook file is carried out for seeking a user confirmation and it may be possible that a user modifies the contents or deletes it intentionally if there is no necessity, upon looking at the display.

By using the contents of the wordbook file, tests for learning are prepared. Here, the frequency of appearance is set with respect to each word so that priority order of test presentation can be controlled and effective learning for users may be improved by presenting a test of high frequency of appearance on ahead.

In the above embodiment, in the flow charts of FIG. 7, FIG. 15 and FIGS. 16(a) and 16(b), they are explained that the processes from the preparation of the search word file shown in FIG. 8 to the preparation and updating of the wordbook file shown in FIG. 12 are carried out by the function for consulting a dictionary, but it is not limited to this.

For example, it may be possible that, in case that a user has conducted the operation for consulting a dictionary, the search word file shown in FIG. 8 or the illustrative sentence file is prepared and upon execution of the learning function, the process for preparing and updating the wordbook file shown in FIGS. 16(a) and 16(b) are carried out.

That is, in the process shown in FIG. 15, process of the step S40 is not carried out and, process for preparing and updating the wordbook file of the step S40 may be carried out in the learning function program of the learning apparatus.

This is effective in such a case that an information terminal in which a user consults a dictionary and a learning terminal are disposed separately, and the memory capacity of the information terminal in which an operation for consulting a dictionary is carried out is small.

At this time, in the information terminal in which the operation for consulting a dictionary is carried out, data of "search word file" shown in FIG. 8 in which small memory capacity works is prepared and this data can be transferred to the memory unit of the learning terminal by storing it in a transportable memory such as an IC card or through a network.

Accordingly, only the "search word file" which a user has acquired by the operation for consulting a dictionary is freely taken out through a transportable memory and incorporated in other learning terminal having process of the step S40 so that a user can carry out learning anyplace.

In particular, in case that the learning terminal is a portable type information terminal or a portable phone, it is possible to carry out learning in transit regardless of time and place so that learning efficiency may be improved.

Then, one embodiment of process for presenting a test for a word test by use of the wordbook file which is prepared as stated above will be described.

FIG. 17 shows one embodiment of criterion items which determine an order of priority in presenting a test. Here, four (4) items of "frequency of presenting a test N1", "difficulty level N2", "time required for an answer N3" and "days required for mastering N4" are shown as the criterion items but they are not limited to these.

Each value of these criterion items may be set by a user.

Here, "difficulty level N2" is not included in the information of the above-stated wordbook file but can be acquired from for example, the result of giving a translation or the result of consulting a dictionary.

As the "time required for an answer N3", time from test presentation on the display unit to an answer input of a user measured by a timer may be used.

Further, as this time N3, it is preferable to save the measured value upon the previous test.

"Days required for mastering N4" may be calculated by the difference of the "master date" to which the master mark ◎ is given and the "register date".

Figure 18:
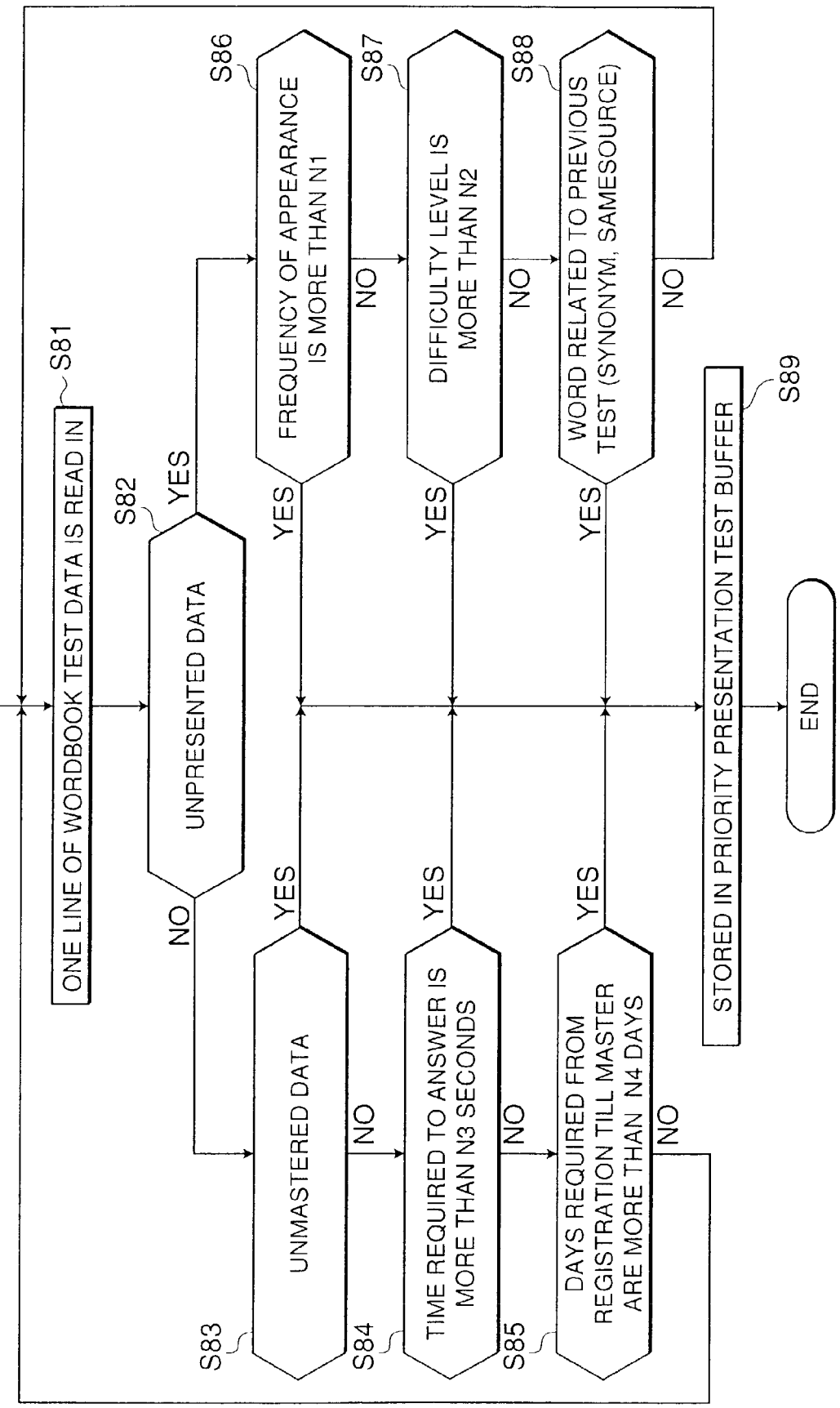
FIG. 18 is a flow chart of one embodiment of test presentation process in the invention.

FIG. 18 shows a flow chart of one embodiment of process for presenting a test in the invention.

Firstly, at a step S81, one line of word test data is read in from the wordbook file.

Then, it is checked whether or not the word test data has been already presented (step S82).

In case of no presentation as a test, the routine goes to a step S83 and it is checked whether or not it is unmastered data. In case of unmastered data, the routine goes to a step S89 and the word test data is stored in a priority presenting test buffer.

Here, the priority presenting test buffer is an area which stores temporarily the word test data, and the word test is presented in its storing order.

In case that it is not unmastered data, it is checked whether or not time required for answer is more than N3 seconds (step S84).

In case of more than N3 seconds, the routine goes to a step S89 and if not, goes to the step S85.

At the step S85, it is checked whether or not days required for mastering are more than N4 days, and in case of more than N4 days, the routine goes to the step S89 and if not, returns to the step S81.

Further, at the step S82, in case that it is unpresented data, the routine goes to the step S86 and it is checked whether or not the frequency of appearance is more than N1 time.

In case of more than N1 time, the routine goes to the step S89 and if not, goes to the step S87.

At the step S87, it is checked whether or not difficulty level of the word test data is more than N2, and in case of more than N2, the routine goes to the step S89 and if not, goes to the step S88.

At the step S88, it is checked whether or not it is a word which relates to a previous test, i.e., a synonym or a word from the same source, and in case of the related word, the routine goes to the step S89 and if not, returns to the step S81.

As stated above, test presenting order is determined by setting various criterion items and therefore, a learning test may be presented in such a manner that a user can master effectively and in a short time.

As a method for presenting a user a learning test whose presenting priority is determined as stated above, there is a method for visually displaying a test sentence on the display unit or a method for phonetically outputting a test sentence by use of a speaker.

Further, as a method for answering by a user, there is a method for inputting characters or selection number through the input unit such as a keyboard or a method for inputting an answer by use of voice.

Further, more effective learning is possible by use of combination of the above-stated methods for presenting a test sentence and for answering, considering advantages of a user. For example, the combination of presenting a test sentence by use of voice and an answer by key-inputting a selection number is effective to a listening test.

Further, it was described above that, in case that the search word file and the wordbook file can be stored in a transportable memory such as an IC card and be taken out, a user may carry out learning anyplace so that it is helpful for improving efficiency of learning. However, in case that a learning terminal is a portable information terminal, there are many cases that its memory capacity is smaller as compared with a desktop type terminal and it is preferable that an amount of data to be taken out is as small as possible.

Therefore, it is preferable for a user himself/herself to be able to select which data should be taken out.

As a method for selecting data to be taken out, it is possible for a user to select one by one by displaying a list of wordbook data but this operation is not easy and so, becomes a burden to a user. Then, criterion for taking out shown in FIG. 19 is preset in advance and data is automatically stored in an IC card based upon the criterion, which is preferable to a user since it does not become a burden to the user.

For example, supposing that capacity for taking out is 5 K bites of a portable phone, data of about twenty five (25) words may be taken out in case that data is about 200 bites per a word data.

Further, in case that master pace of a user is about 10 words per one day as average and there is necessity that words for two (2) weeks, i.e., 140 words have to be taken out, data for taking out may be automatically stored in an IC card by such setting.

According to the learning apparatus of the invention, information necessary for learning is obtained from information relating to an index word which is searched by a dictionary search and therefore, its information can be acquired easily without any burden to users and it becomes possible to carry out effective learning with respect to each user.

Further, since an illustrative sentence which a user once looked at directly is acquired, effective learning to the user can be carried out by presenting a learning test which presents this illustrative sentence.

Furthermore, since the number of searching words by a user is registered, a test may be presented with priority as to a word that a user has not yet mastered and a word that it takes time to master and therefore, it is possible to carry out effective learning to the user.

3. Concrete Structure of Portable Information Terminal and Embodiment of its Learning Process Hereinafter, a concrete structure of the portable information terminal 4 and an embodiment of its learning process will be described. Here, the portable information terminal 4 is called as an electronic learning apparatus.

This invention provides an electronic learning apparatus which comprises an information receiving unit for receiving plural kinds of test preparation use information, a received information storage unit for storing the received information, a test preparation unit for preparing a test in accordance with a kind of the received information, and a display unit for displaying a display content including the prepared test on a screen.

That is, one of features of the electronic learning apparatus of the invention is such a point that plural kinds of test preparation use information provided by an outside test master is received and various tests are prepared in accordance with a kind of the received information and they are presented to respondents.

Here, the plural kinds of test preparation use information are, in case that they are, for example, of English word test preparation use, plural kinds of combination of an index word (or index), a word class, a translation and an illustrative sentence of a word which is selected from an English-Japanese or Japanese-English dictionary and for example, they are:

(1) Index of a word and its translation,
(2) Index of a word, its translation and indexes of other plural words which are similar to the word,
(3) Index of a word, its translation and an illustrative sentence including the index, and
(4) Index of a word, its translation, an illustrative sentence including the index and indexes of other plural words which are similar to the word.

In this case, a test prepared by a test preparation unit is, for example, tests such as:

a word card test in which a translation of a word is requested to be answered in accordance with the above (1), a multiple choice test in which a translation of a word is requested to be selected from plural options in accordance with the above (2), a fill-in window test in which a blank part in an illustrative sentence is filled in accordance with the above (3), and a fill-in window test in which a blank part in an illustrative sentence is filled from an option in accordance with the above (4).

A test master, for example, may arrange test preparation use information at a terminal apparatus like a personal computer and may distribute it by use of a wireless or wired communication line through an apparatus like a server. In this case, it may be possible that the information receiving unit of the invention has a function for receiving information which is provided from outside and a known small size communication terminal, for example, a receiving apparatus which is built in a portable phone may be preferably used as this unit.

However, the information receiving unit is not limited to this and an FD drive device, a tape recorder, a memory stick reader may be used as this unit in accordance with information providing manner.

Further, the received information storage unit which stores information which is received (received information) may be constructed by for example, a RAM and also, may be constructed integrally with a microcomputer, together with the test preparation unit which prepares a test in accordance with a kind of information which is received.

Further, a small size liquid crystal display and an EL display may be preferably used in the display unit.

An electronic learning apparatus of the invention may further comprise an input unit by use of which an answer is inputted according to need and an answer evaluation unit for evaluating the inputted answer and displaying the evaluation result on the display unit.

It may further comprise a display content adjustment unit for adjusting in such a manner that display contents to be displayed on the display unit may be displayed within one screen of the display unit. Incidentally, the answer evaluation unit and the display content adjustment unit may be constructed integrally with the microcomputer.

As stated above, the electronic learning apparatus of the invention comprises the information receiving unit, the received information storage unit, the test preparation unit and the display unit as its basic structure, and further comprises the answer evaluation unit and the display content adjustment unit as its additional structure, and a hardware portion of such structures may be united with a small size communication terminal such as a portable phone, and since storage capacity (memory capacity) of the received information storage unit is small, a portable information terminal of the invention is easily constructed by being incorporated with a portable communication terminal which is generally used by changing only software.

Further, because of the relation between the test preparation use information and the test prepared as stated above, in a learning electronic apparatus of the invention, in case that the received test information comprises a plurality of index words, translation corresponding to each index word and semantic attribute, the test preparation unit may prepare a test in which, with regard to one (1) index word, a correct translation is to be selected from its translation and a plurality of translations which have the same semantic attributes.

In case that the received test information comprises an index word and a sentence including the index word, the test preparation unit may search the index word in the sentence and deletes the word, and may prepare a test in which the index word has to be filled in the sentence in which the index word is deleted.

In case that the received test information includes a plurality of index words and a translation which corresponds to one of them, the test preparation unit may prepare a test in which the index word which corresponds to the translation is to be selected from a plurality of index words.

In case that the received information comprises an index word and a sentence including the index word and a mark is added to the index word in the sentence, the test preparation unit may delete the index word with the mark from the sentence and may prepare a test in which the index word is to be filled in the sentence in which the index word is deleted.

In case that the received information comprises an index word, a sentence including the index word and a plurality of other index words, the test preparation unit may delete the index word in the sentence, and may prepare a test in which a correct index word is to be selected from the deleted index word and a plurality of other index words and to be filled in the deleted portion of the sentence.

Figure 20:
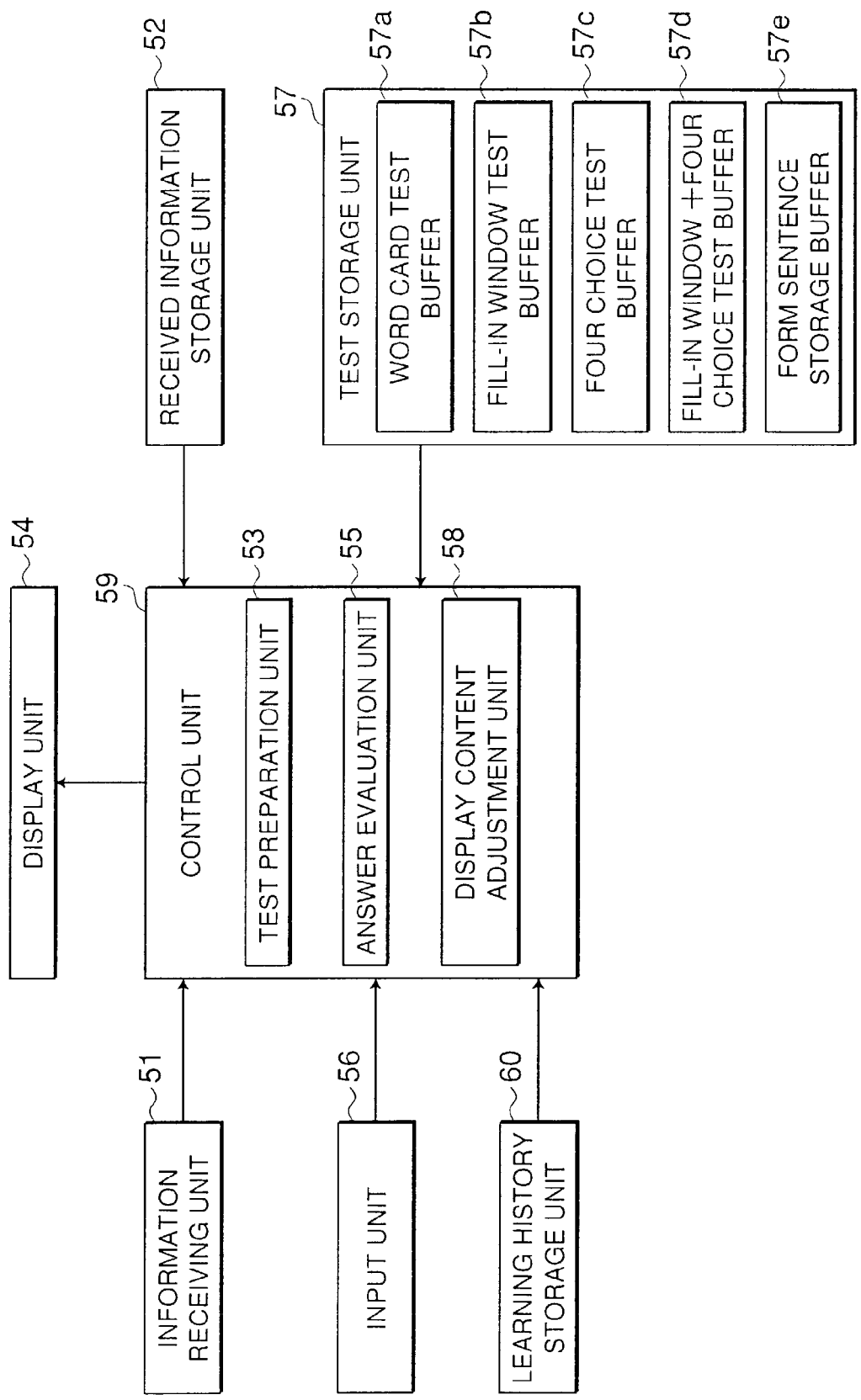
FIG. 20 is a block diagram which shows an electronic circuit of an embodiment of the invention.

FIG. 20 is a block diagram which shows an electronic circuit of the embodiment according to the electronic learning apparatus of the invention. As shown in the same figure, the electronic learning apparatus comprises an information receiving unit 51 for receiving plural kinds of test preparation use information, a received information storage unit 52 for storing temporarily the received information, a test preparation unit 53 for preparing a test in accordance with a kind of the received information, a test storage unit 57 for storing temporarily the prepared test and a display unit 54 for displaying the read-out test from the test storage unit 57 on a screen.

Further, the electronic learning apparatus comprises a display adjustment unit 58 for adjusting in such a manner that display contents to be displayed on the display unit 54 are displayed within one screen of the display unit 54, an input unit 56 in which a user inputs an answer, an answer evaluation unit 55 for evaluating the inputted answer and displaying the evaluation result on the display unit 54, a learning history storage unit 60 for storing learning history of a respondent and a control unit 59 for controlling the above each unit.

Further, the test storage unit 57 comprises a word card test buffer 57*a*, a fill-in window test buffer 57*b*, a four (4) choice test buffer 57*c* and a fill-in window+four (4) choice test buffer 57*d*, in order to store the prepared test in accordance with its kind, and further comprises a format sentence storage buffer 57*e* for storing format sentences which are added to the prepared test.

Incidentally, in this embodiment, the information receiving unit 51 comprises a receiving apparatus for use in a portable phone, the input unit 56 comprises a keyboard or a push button switch for inputting numerals, Japanese and English characters and various functions, and a liquid crystal display is used as the display unit 54. Then, the received information storage unit 52, the test preparation unit 53, the answer evaluation unit 55, the test storage unit 57, the display content adjustment unit 58, the control unit 59 and the learning history storage unit 60 are constructed integrally with a microcomputer which comprises a CPU, a ROM and a RAM.

Operations of such a structure will be then, described.

Firstly, in case that the information receiving unit 51 receives test preparation use information (hereinafter, referred to as word test preparation use data), the word test preparation use data is stored in the received information storage unit 52 as shown in FIG. 24.

All of word test preparation use data comprise at least, an index (index word), word class and translation, and may further a semantic attribute, an example of a wrong answer, and an illustrative sentence.

Figure 21A:
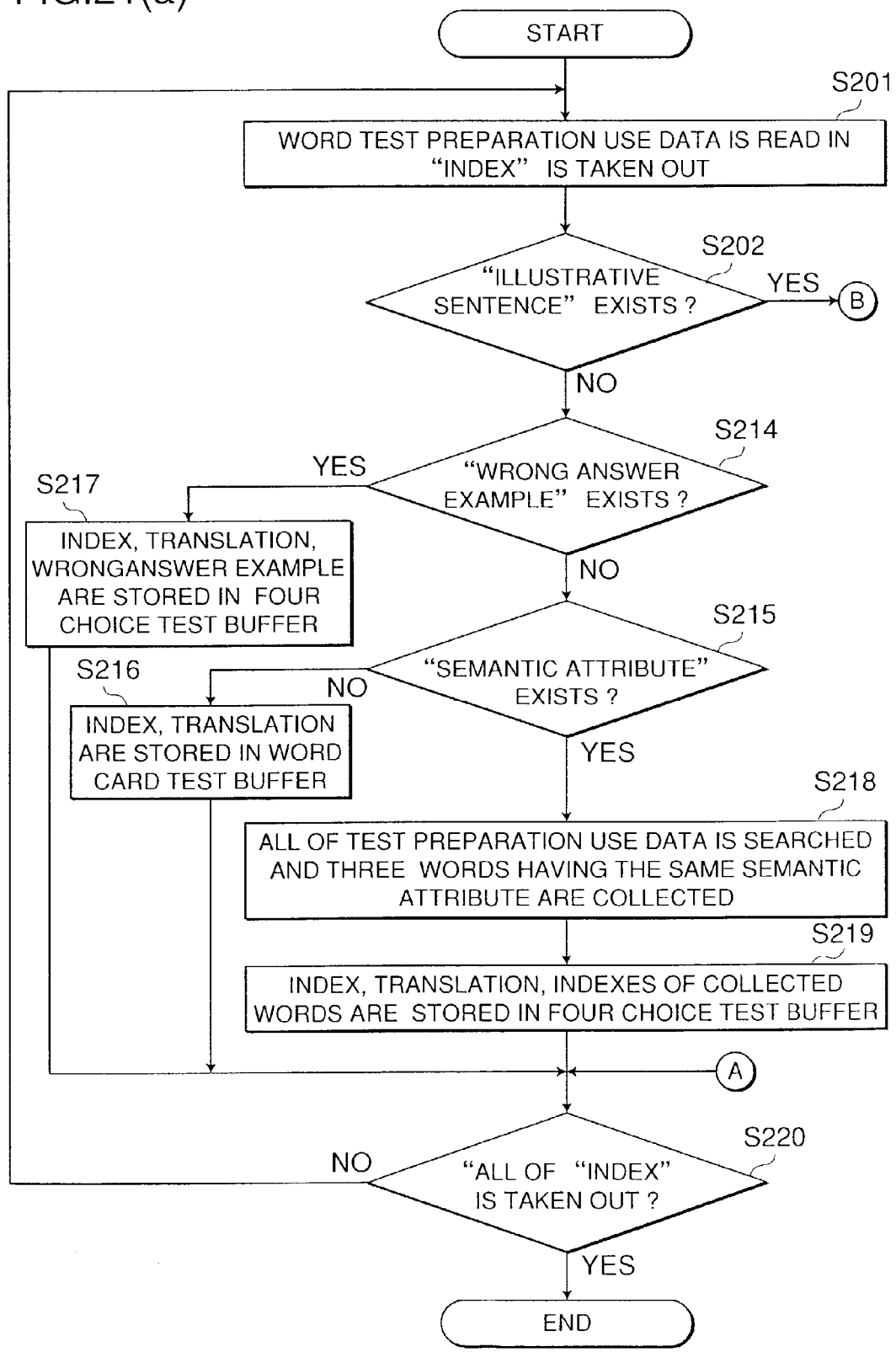
FIGS. 21(a), 21(b) and 21(c) are flow charts which show operations of an embodiment of the invention.
Figure 21B:
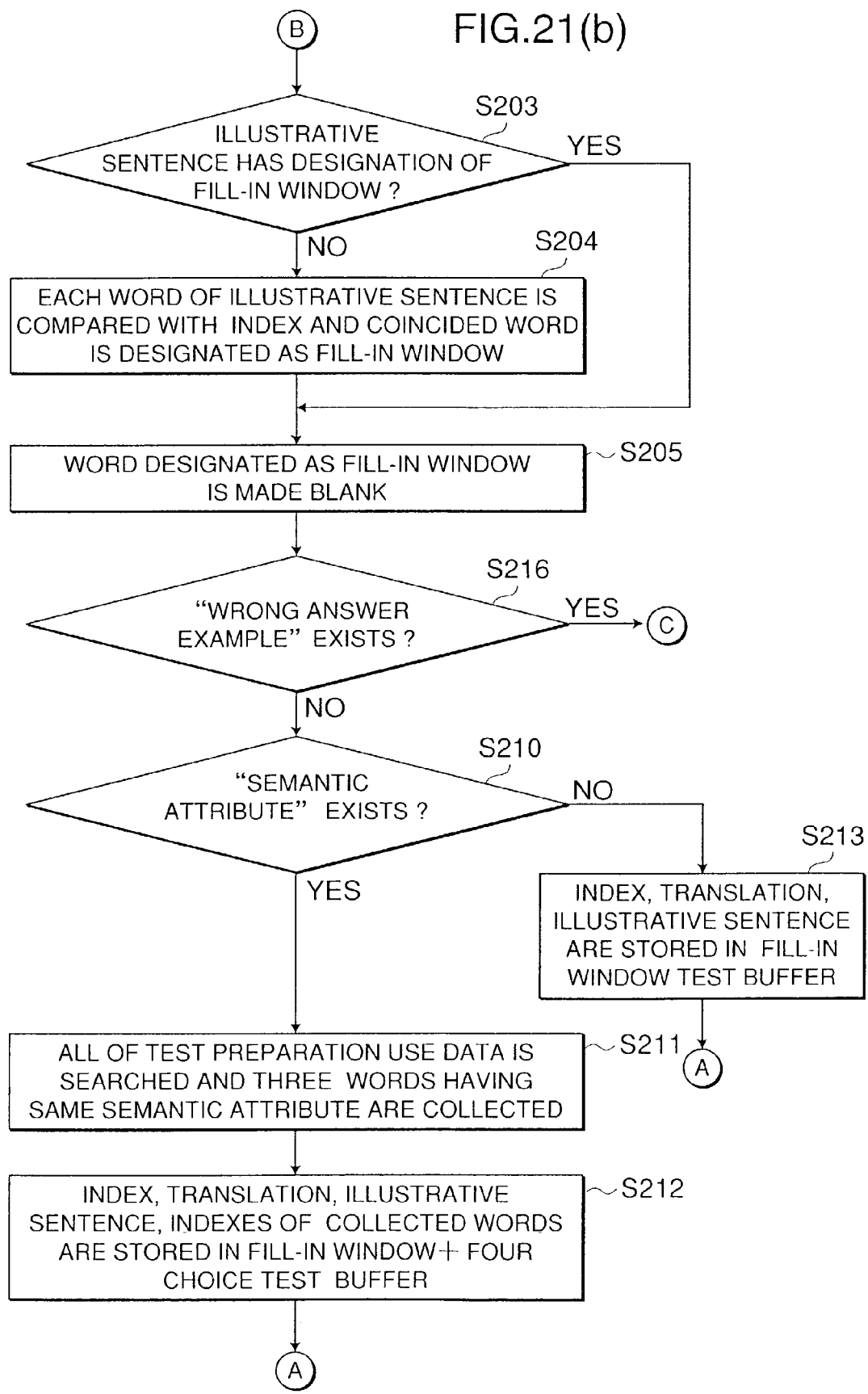
Figure 21C:
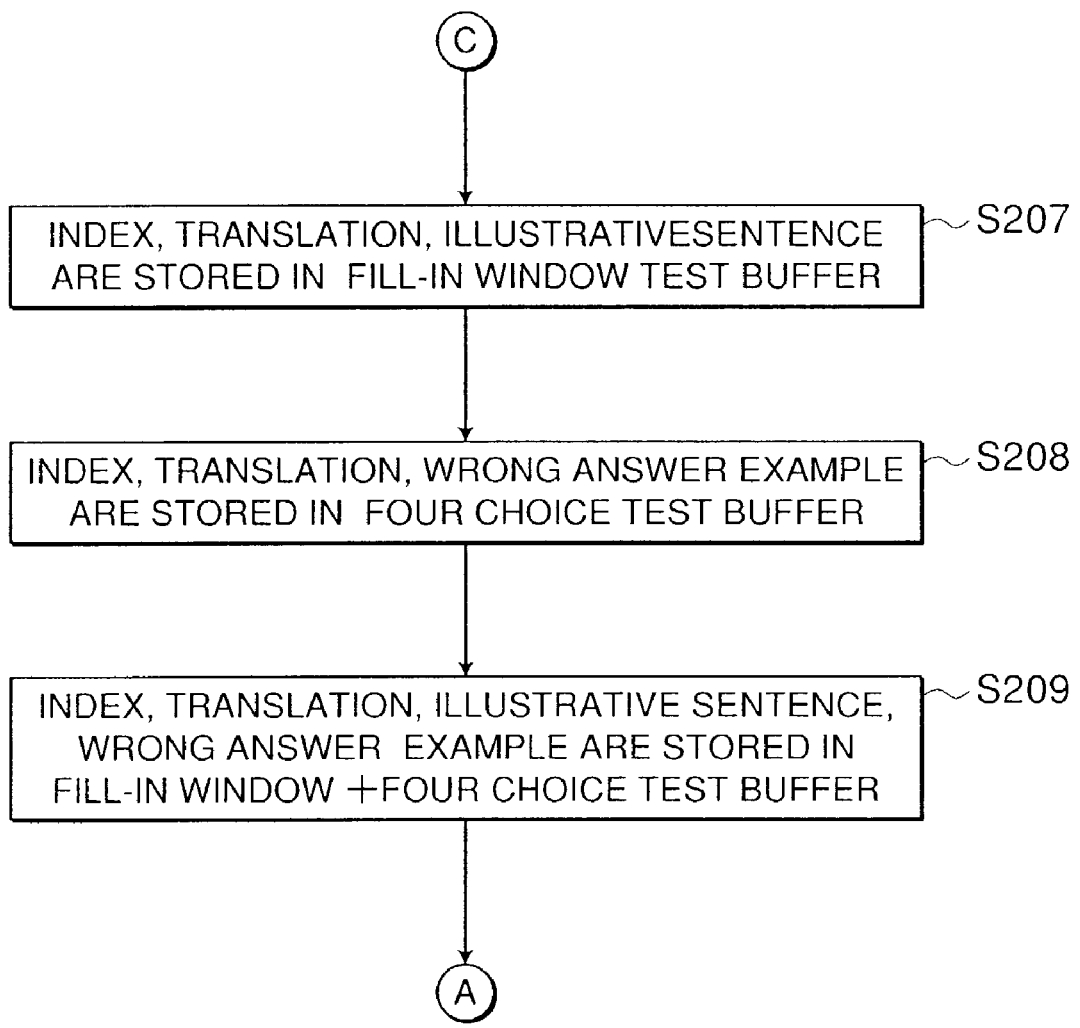

Then, the test preparation unit 53 stores the test presenting data in the test buffers 57*a*-57*d* which respond to convert word test preparation use data to test presenting data by processes shown in a flow chart of FIGS. 21(*a*), 21(*b*) and 21(*c*).

In FIGS. 21(*a*), 21(*b*) and 21(*c*), firstly, word test preparation use data is read out from the received information storage unit 52 by predetermined processes and "index" is picked out from the data (step S201).

Then, in case that the data includes an illustrative sentence (step S202) and the illustrative sentence does not have a fill-in window designation (an identification mark such as ( ) and a underline is added to a word so that the word is designated in an illustrative sentence)(step S203), each word in the illustrative sentence is compared with the index and the word which coincides to the index is designated as fill-in window (step S204).

Then, it is processed in such a manner that a word as fill-in window designation in an illustrative sentence is made blank (a sentence with fill-in window is formed) (step S205), and in case that "an example of a wrong answer" exists in the word test preparation use data (step S206), an index, translation and an illustrative sentence are stored in the fill-in window test buffer 57*b* (step S207), and at the same time, the index and the example of the wrong answer are stored in the four (4) choice test buffer 57*c* (step S208), and further, the index, an illustrative sentence with fill-in window and the example of the wrong answer are stored in the fill-in window+four (4) choice test buffer 57*d* (step S209).

At the step S206, in case that no "example of a wrong answer" exists but there is a semantic attribute (step S210), all of the word test preparation use data which is stored in the received information storage unit 52 are searched so that three (3) words having the same semantic attributes are collected (step S211). Then, an index, a translation, an illustrative sentence and indexes of the collected words are stored in the fill-in window+four (4) choice test buffer 57*d* (step S212). Further, at the step S210, in case that no "semantic attribute" exists, an index, a translation and an illustrative sentence are stored in the fill-in window test buffer 57*b* (step S213).

In case that there exists no illustrative sentence at the step S202 and further, there exists no "example of a wrong answer" or no "semantic attribute" (steps S214, S215), an index and a translation are stored in the word card test buffer 57*a* (step S216). Then, at a step S214, in case that there exists "an example of a wrong answer", an index, a translation and the example of the wrong answer are stored in the four (4) choice test buffer 57*c* (step S217).

Further, in case that there exists "semantic attribute" at the step S215, all of the word test preparation use data which is stored in the received information storage unit 52 are searched, and three (3) words which have the same semantic attributes are collected (step S218), and an index, a translation and indexes of the collected words are stored in the four (4) choice test buffer 57*c* (step S219).

The foregoing processing is carried out for all of the word test preparation use data which is stored in the received information storage unit 52 (step S220).

FIG. 24 shows a concrete example of the word test preparation use data which is stored in the received information storage unit 52. Then, more concrete processing in the test preparation unit 55 will be described by use of the word test preparation use data shown in FIG. 24 and the flow char of FIGS. 21(*a*), 21(*b*) and 21(*c*).

In FIGS. 21(*a*), 21(*b*) and 21(*c*), firstly, an index "dainty" of No.1 word test preparation use data is picked out in FIG. 24 (step S201). Then, it is confirmed whether or not "illustrative sentence" exists (step S202), "example of wrong answer" exists (step S214) or "semantic attribute" exists (step S215). Since each of the above is not included in the No.1 word test preparation use data, the index "dainty" and its translation "上品な" are stored as word card test presentation data in the word card test buffer 57*a* as shown at No.1-1 of FIG. 25 (step S216) and the process returns to the step S201.

Then, at the step S201, an index "observation" of No.2 word test data is picked out in FIG. 24. Then, it is confirmed whether or not "illustrative sentence" exists (step S202) and since there exists no "illustrative sentence" as to this word test data, then, it is confirmed whether or not there exists "example of wrong answer" (step S214). Since this word test data has (1) "agreement", (2) "contract", (3) "declaration" as the example of wrong answer, the index "observation", its translation "観察" and wrong answer examples (1)-(3) are stored in the four (4) choice test buffer 57*c* as four (4) choice test presentation data as shown at No. 3-1 of FIG. 27 (step S207) and the process returns to the step S201.

Then, at the step S201, an index "mouth" of No.3 word test data is picked out in FIG. 24. Then, it is confirmed whether or not there exists "illustrative sentence" (step S202) and since this word test data has the "illustrative sentence", it is then, confirmed whether or not there exists fill-in window designation in the illustrative sentence, i.e., whether or not there exists a word having ( ) in the illustrative sentence (step S203). Since this illustrative sentence has a word having ( ), a word in ( ) is deleted (step S205).

Then, it is confirmed whether or not there exists "wrong answer example" (step S206) and since this word test preparation use data has the wrong answer examples (1)-(3), an index, a translation and an illustrative sentence are stored in the fill-in window test buffer 57*b* as shown at No.2-1 of FIG. 26. Further, an index "mouth", its translation "口" and wrong answer examples (1)-(3) are stored in the four (4) choice test buffer 57*c* as shown at No.3-2 in FIG. 27, and further, the index, translation, illustrative sentence and wrong answer examples are stored in the fill-in window+four (4) choice test buffer 57*d* as shown at No.4-1 in FIG. 28 (steps S207, S208, S209). Then, routine returns to the step S201.

Then, at the step S201, an index "stadium" of No. 4 word test data is picked out in FIG. 24. Since this word test data has an illustrative sentence in which there exists no word of fill-in window designation, i.e., no word having ( ), the routine goes to the steps S202, S203, S204, and at the step S204, the "index" is compared with each word of the illustrative sentence, and the word which coincides to the index is designated as fill-in window, i.e., ( ) is added to the word, and a word in ( ) is deleted at the step S205.

Then, it is confirmed whether or not there exists "wrong answer example" (step S206) and since this word test preparation use data does not have the "wrong answer example", then, it is confirmed whether or not there exists "semantic attribute" (step S210).

Since this word test data has a semantic attribute "building",all word test data which is stored in the received information storage unit 52 is searched and three (3) indexes of words (Nos. 15, 26, 37 in FIG. 24) which have the same semantic attribute are collected (step S211). Then, the index, translation, illustrative sentence and collected three indexes are stored in the fill-in window+four (4) choice test buffer 57*d* as shown at No. 4-2 in FIG. 28 (step S212). By repeating such processing, all indexes in FIG. 24 are picked out and then, the test preparation unit 53 completes its operation.

Figure 22A:
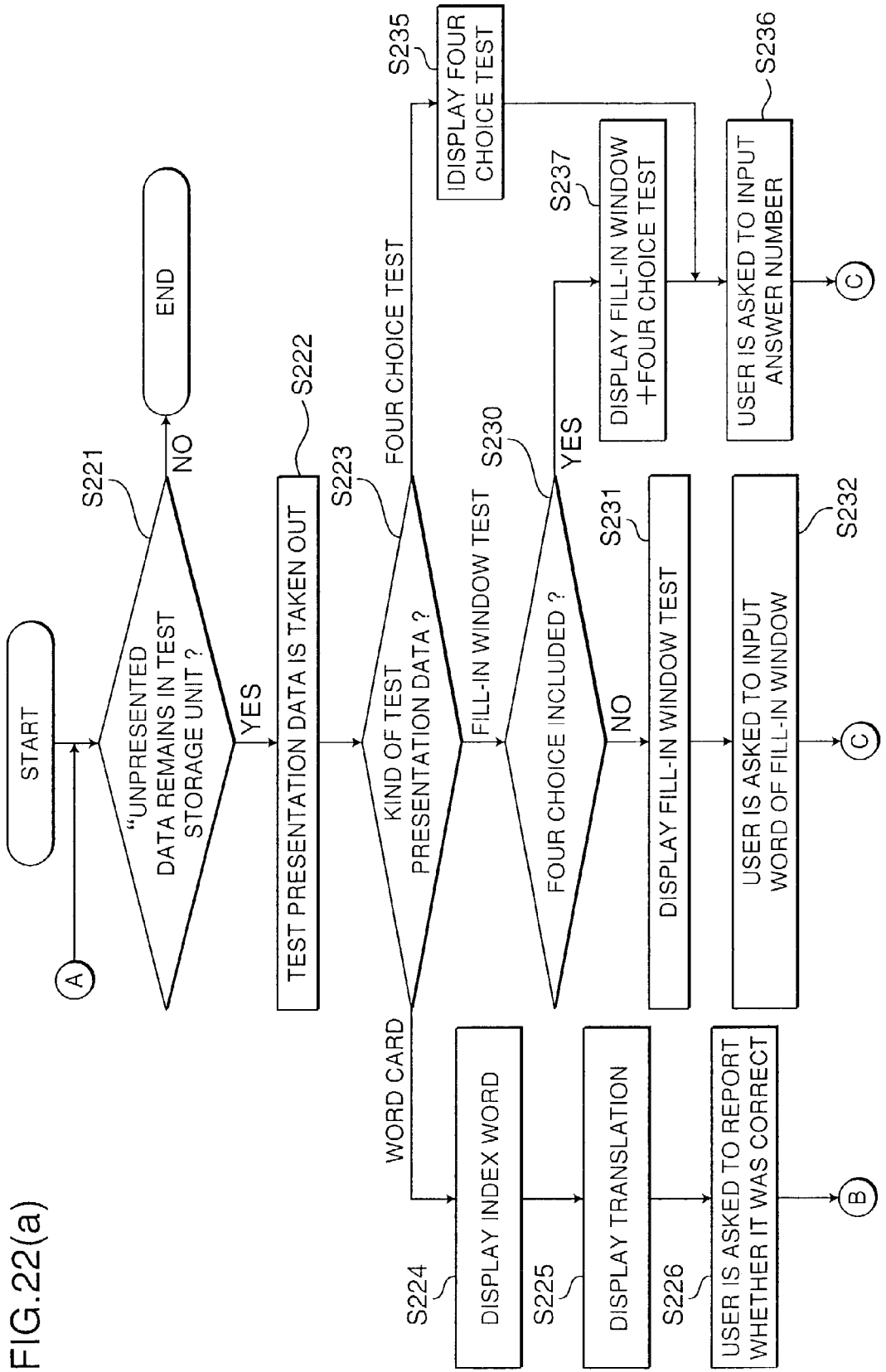

Then, test presenting operation of this electronic learning apparatus will be described by use of a flow chart of FIGS. 22(*a*) and 22(*b*).

In case that a respondent operates the input unit 56 and instructs start of test presentation, it is confirmed whether or not there exists (remains) unpresented test data in each of the test buffers 57*a*-57*d* of the test storage unit 57 (step S221). In case that test presentation data which is stored in the test buffers 57*a*-57*d* is unpresented test data (step S221), index "dainty" and its translation "上品な" are picked out as word card test presentation data which is stored in the word card test buffer 57*a* from No. 1-1 in FIG. 25 (steps S222, S223). Then, a form sentence for use in a question which is stored in the form sentence storage buffer 57*e* is added to the index and displayed as follows (step S224).

What is the meaning of "dainty"?

Then, after the lapse of predetermined time (time that a respondent think an answer), correct answer presentation use form sentence is added to the translation and displayed as follows (step S225).

The correct answer is "上品な".

Then, the respondent is asked to input as to whether or not it was correct from the input unit 56 (step S226) and in case that "It was correct" is inputted (step S227), it is certified that this word is mastered. Then, its master date and time is stored in the learning history storage unit 60 and the number of correct answers which is stored is updated (step S228). Further, in case that it was not correct, test presentation date and time, the number of test presentation and total number of test presentation which are stored in the learning history storage unit 60 with regard to this test are updated (step S229) and routine returns to the step S221.

Then, fill-in window test presentation data which is stored in the fill-in window test buffer 57*b* and is shown at No.2-1 in FIG. 26 is picked out as a fill-in window test (steps s221-S223). Then, since this test presentation data does not include option for use in answering (step S230), a form sentence for use in a question is added to the test presentation data and displayed as follows (step S231).

What is the translation of "口" to be filled in?

My ( ) dropped out when I heard it.

Then, a respondent input a word to be filled in ( ) (step S232) and then, it is confirmed whether or not it coincides with the correct answer "mouth" by the answer evaluation unit 58 (step S233). Then, in case that it coincides with the correct answer, routine goes to steps S228, S229 and in case that it does not coincide, the correct answer is displayed (step S234) and routine goes to the step S229.

Then, four (4) choice test presentation data which is stored in the four (4) choice test buffer 57*c* and shown at No.3-1 in FIG. 27 is picked out as a four (4) choice test (steps S221-S223). Then, a form sentence for use in a question is added to this test presentation data and displayed as follows (step S235).

Please select an English which corresponds to the following Japanese.

観察

(1) agreement (2) contract (3) declaration (4) observation

In case that a respondent inputs an answer number (step S236), routine goes to a step S233 and similar processing as stated above is carried out.

Then, four (4) choice test presentation data which is stored in the four (4) test buffer 57*c* and shown at No. 3-2 in FIG. 27 is picked out as four (4) choice test and displayed as follows in similar manner as stated above.

Please select an English which corresponds to the following Japanese.

口

(1) mouth (2) ear (3) eye (4) hair

Thereafter, similar processing as stated above is carried out.

Then, test presentation data which is stored in the fill-in window+four (4) choice test buffer 57*d* and shown at No. 4-1 in FIG. 28 is picked out and a form sentence for use in a question is added thereto and displayed as follows (steps S221-S223, S230, S237).

What is an English to be filled in the following?

My ( ) dropped out when I heard it.

(1) mouth (2) ear (3) eye (4) hair

In case that a respondent inputs an answer number to it (step S236), routine goes to a step S233 and similar processing as stated above is carried out.

Then, test presentation which is stored in the fill-in window+four (4) choice test buffer 57*d* and shown at No. 4-2 in FIG. 28 is picked out in the same manner and displayed as follows (steps S221-S223, S230, S237).

What is an English to be filled in the following?
He played rugby in many ( )s.
(1) hall
(2) tower
(3) stadium
(4) shack In case that a respondent inputs an answer number (step S236), routine goes to a step S233 and thereafter, similar processing as stated above is carried out.

As stated above, a word test is prepared from word test preparation use data which is received by the information receiving unit 51 and provided to a respondent, and an answer of a respondent is evaluated and learning history is recorded.

Incidentally, contents which are stored in the learning history storage unit 60 are displayed on the display unit 54 by operation of a respondent at the input unit 56.

Further, order of test presentation may be order of storing in the test storage unit 57, or may be order which is selected and determined by operation of a respondent at the input unit 56, or random order.

Figure 23:
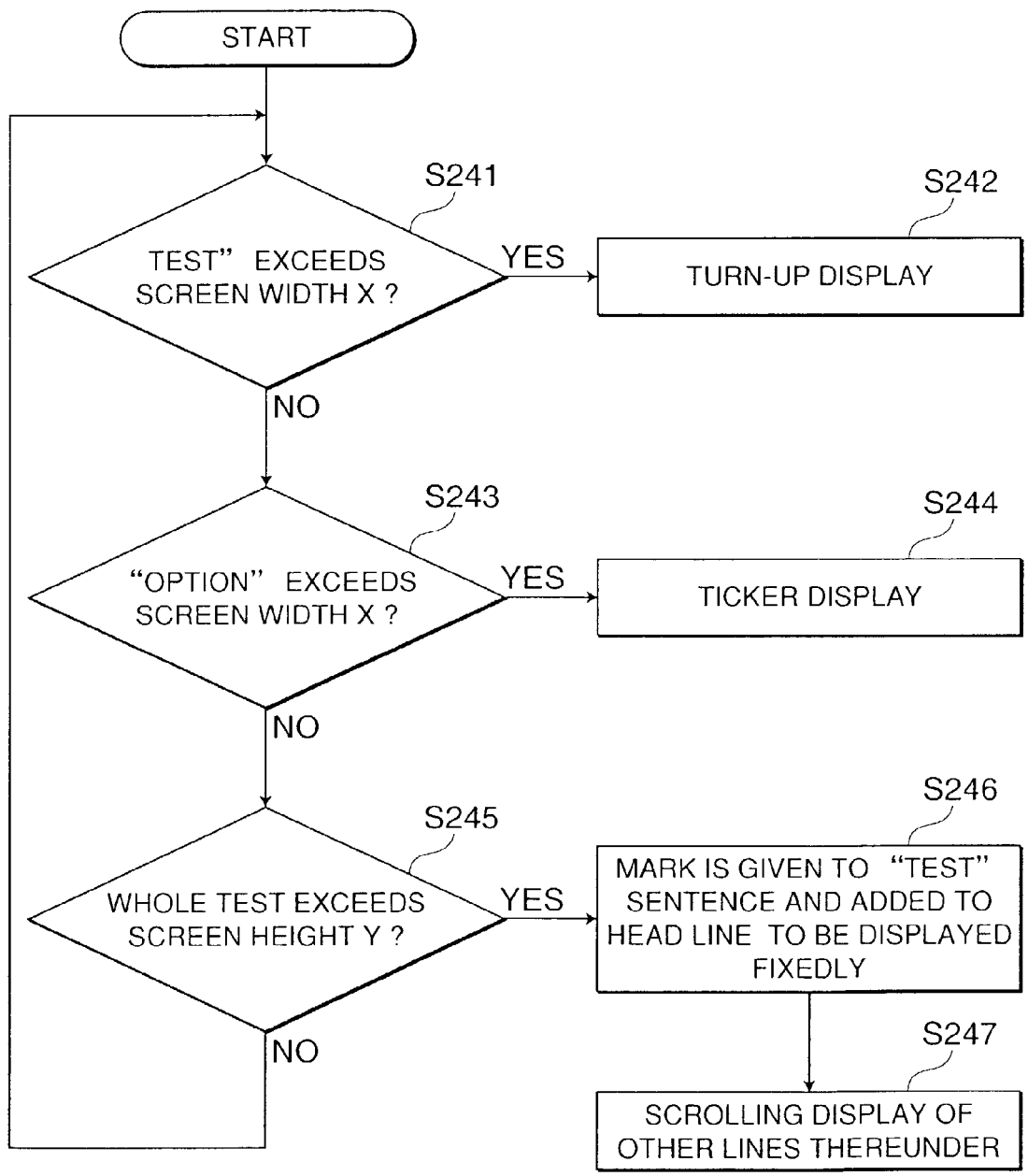
FIG. 23 is a flow chart which shows operations of an embodiment of the invention.

FIG. 23 is a flow char which shows operation of the display content adjustment unit 58 and display data is adjusted in such a manner that it falls within one screen of the display unit 54 according to this flow chart.

That is, in case that there are many characters in "test" to be presented and its display exceeds width of the screen, the display data is adjusted in such a manner that turn-up display is carried out (steps S241, S242).

Further, in case that there are many characters in "option" to be presented and its display exceeds width of the screen, the display data is displayed in ticker manner (steps S243, S244).

Further, in case that the display data to be presented exceeds height of the screen, a form sentence of "question" is converted to a mark (or abbreviation) and then, added to head line of a test and displayed fixedly and other lines thereunder are displayed in scrolling manner (steps S245-S247).

By carrying out processing in such a manner, even in case that the display unit has a screen of small area, all display data relating to one test may be displayed within one screen.

According to the electronic learning apparatus of the invention, since a test is prepared in accordance with a kind of information which is received from an external test master, a lot of tests may be presented by use of small memory capacity and further, since it is of small size and rich transportability, usability may be good to users, and motivation of learning may be improved and outstanding learning effect may be obtained.

According to the invention, since learning information including results of learning at an information processing apparatus or a portable information terminal is stored in a learning management server, continuous learning may be resumed at the information processing apparatus or the portable information terminal by use of the learning information which is stored in the learning management server, even in case that a user once discontinues learning at the information processing apparatus or the portable information terminal, and effective learning to its user may be carried out without any constrain of time and place.

Further, since user information is registered in the learning management server and the learning information includes the user information, one user who learned at the information processing apparatus may carry out continuous learning at the portable information terminal which is owned by the user even in such a manner that a plurality of users carry out learning at the information processing apparatus, and a plurality of users may use this learning support system.

Further, in case that the learning information which includes results of learning at the portable information terminal is transferred to the information processing apparatus through the learning management server with respect to each user, the information processing apparatus may manage percentage of completion of learning etc. in one lump.

What is claimed is:

1. A learning support system comprising:
an information processing apparatus,
a portable information terminal, and
a learning management server,
the information processing apparatus, the portable information terminal and the learning management server being connected through a network,
wherein the information processing apparatus comprises a first memory unit for storing first learning contents which comprise a learning program and data for use in learning words in an index, a second memory unit for storing first learning information which includes at least a result of learning for a user when the user uses the information processing apparatus, a first control unit for executing the learning program to provide first word-learning displays comprising the index words, and a first communication unit for communicating with the learning management server,
the portable information terminal comprises a third memory unit for storing second learning contents which comprise a portable use learning program and data for use in learning the index words, a fourth memory unit for storing second learning information which includes at least a result of learning for the user when the user uses the portable information terminal, a second control unit for executing the portable use learning program to provide second word-learning displays comprising the index words and a second communication unit for communicating with the learning management server,
the learning management server comprises a third communication unit for communicating with the information processing apparatus and the portable information terminal, and a fifth memory unit for storing the first learning information which is transferred from the information processing apparatus and the second learning information which is transferred from the portable information terminal,
the first control unit executes the learning program after the second learning information is acquired through the fifth memory unit so that the user's learning when the user uses the portable information terminal can be resumed and continued at the information processing apparatus,
the second control unit executes the portable use learning program after the first learning information is acquired through the fifth memory unit so that the user's learning when the user uses the information processing apparatus can be resumed and continued at the portable information terminal, and
the first and second learning information includes numbers of searches for the index words and the first and second control units use the numbers of searches for the index words to determine which index words are displayed in the first and second word-learning displays.

2. A learning support system of claim 1, wherein the learning management server further comprises a sixth memory unit, and in case that the user purchases the first and second learning contents, the learning management server is connected through the network to a content server which stores the first and second learning contents, the first and second learning contents are acquired from the content server and stored in the sixth memory unit, and the stored first and second learning contents are transferred to the information processing apparatus and the portable information terminal, respectively.

3. A learning support system of claim 1, wherein the information processing apparatus further comprises an input unit, and in case that an instruction to complete learning or to discontinue learning is inputted by the input unit, the first learning information which has been stored in the second memory unit is transferred to the learning management server through the first communication unit, and after the transferred first learning information is stored in the fifth memory unit by the learning management server, the first learning information stored in the fifth memory unit is acquired by the portable information terminal through the second communication unit and stored in the fourth memory unit.

4. A learning support system of claim 1, wherein the portable information terminal further comprises an input unit, and in case that an instruction to complete learning or to discontinue learning is inputted by the input unit, the second learning information which has been stored in the fourth memory unit is transferred to the learning management server through the second communication unit, and after the transferred second learning information is stored in the fifth memory unit by the learning management server, the second learning information stored in the fifth memory unit is stored in the second memory unit or the fourth memory unit by the information processing apparatus or the portable information terminal.

5. A learning support system of claim 1, wherein the learning management server further comprises a sixth memory unit for storing pre-registered user information, the learning support system comprises a plurality of additional portable information terminals whose users are different, and in case that the first learning information which is transferred to the fifth memory unit of the learning management server includes specific user information, the first learning information is transferred only to a portable information terminal which corresponds to user information that is stored in the sixth memory unit and coincides with the specific user information.

6. A learning support system of claim 1, wherein, if the number of searches for one of the index words exceeds a specified number, a frequency of presenting a test for the one index word is increased.

7. A learning support system comprising:
an information processing apparatus,
a portable information terminal, and
a learning management server,
the information processing apparatus, the portable information terminal and the learning management server being connected through a network,
wherein the information processing apparatus comprises a first input unit, a first memory unit for storing first learning contents which comprise a learning program and data for use in learning, a second memory unit for storing first learning information which includes at least result of learning, a first control unit for executing the learning program to provide first word-learning displays comprising index words, an information memory unit comprising the index words and information associated with the index words, a first communication unit for transferring first learning information which is test preparation use information for the portable information terminal to the learning management server and for receiving second learning information which is result of learning at the portable information terminal from the learning management server, a search unit for searching the information memory unit by an index word which is inputted from the first input unit, a temporary storage unit for storing the second information associated with the index word which is searched by the search unit, a data acquiring unit for acquiring data necessary for learning in the second information stored in the temporary storage unit, a file preparation unit for preparing a search information file which includes data acquired by the data acquiring unit and the inputted index word, and a first test preparation unit for preparing the first learning contents by use of the search information file prepared by the file preparation unit, the portable information terminal comprises a third memory unit for storing second learning contents which comprise a portable use learning program and data for use in learning, a fourth memory unit for storing second learning information which includes at least result of learning at the portable information terminal, a second control unit for executing the portable use learning program to provide second word-learning displays comprising the index words and a second communication unit for receiving the first learning information from the learning management server and for transferring the second learning information to the learning management server, and a second test preparation unit for preparing the second learning contents associated with the first learning information and for storing the second learning contents in the third memory unit, the learning management server comprises a third communication unit for communicating with the information processing apparatus and the portable information terminal, and a fifth memory unit for storing the first learning information which is transferred from the information processing apparatus and the second learning information which is transferred from the portable information terminal, one of the information processing apparatus and the portable information terminal carries out learning, after learning information of the other of the information processing apparatus and the portable information terminal is acquired through the fifth memory unit, and the first and second learning information includes numbers of searches for the index words and the first and second control units use the numbers of searches for the index words to determine which index words are displayed in the first and second word-learning displays.

8. An information processing apparatus which is part of a learning support system which also includes a learning management server and a portable information terminal, the information processing apparatus comprising a first memory unit for storing first learning contents which comprise a learning program and data for use in learning words in an index, a second memory unit for storing first learning information which includes at least a result of learning for a user when the user uses the information processing apparatus, a first control unit for executing the learning program to provide first word-learning displays comprising the index words, and a first communication unit for communicating with a learning management server, wherein the first learning information which has been stored in the second memory unit is transferred to the learning management server through the first communication unit, second learning information, which includes at least a result of learning for the user when the user uses the portable information terminal, is received from the learning management server through the first communication unit and stored in the second memory unit, the first control unit executes the learning program with reference to the second learning information so that the user's learning when the user uses the portable information terminal can be resumed and continued at the information processing apparatus, the first and second learning information includes numbers of searches for the index words, and the first control unit uses the number of searches for the index words to determine which index words are displayed in the first word-learning displays.

9. An information processing apparatus of claim 8 comprising a first input unit for inputting characters and marks, a first display unit for displaying text, an information memory unit comprising first information of the index words and second information associated with the index words, a search unit for searching the information memory unit by an index word which is inputted from the first input unit, a temporary storage unit for storing the second information associated with the index word which is searched by the search unit, a data acquiring unit for acquiring data necessary for learning in the second information stored in the temporary storage unit, a file preparation unit for preparing a search information file which includes data acquired by the data acquiring unit and the inputted index word, and a test preparation unit for preparing the first learning contents by use of the search information file prepared by the file preparation unit.

10. An information processing apparatus of claim 9, wherein in case that the first information is an index of a word, the data acquiring unit acquires head translation of each acceptation or head translation of head acceptation which is included in the second information associated with the searched index word.

11. An information processing apparatus of claim 10, wherein the data acquiring unit acquires a sentence which includes the inputted index word in the text displayed on the first display unit.

12. An information processing apparatus of claim 9, further comprising a learning information preparation unit for preparing a learning information file to prepare a test for learning, in which the learning information preparation unit prepares a learning information file which includes at least one of the index words, data acquired by the data acquiring unit, and the number of searches for the index word with regard to the index word which is included in the search information file, and in case that the index word is already included in the learning information file, the number of searches is updated.

13. An information processing apparatus of claim 12, wherein the learning information file includes master information which is given based upon master instruction inputted from the first input unit with respect to each index word and its master date, and in case that an index word which is already registered in the learning information file and to which master information is given is searched by the search unit, the learning information preparation unit deletes master information which corresponds to the index word from the learning information file, and an alarm which shows that the index word has already been mastered is displayed on the first display unit.

14. An information processing apparatus of claim 9 further comprising a taken-out information setting unit for setting a criterion which determines information to be taken out from the search information file, and an information selecting unit for selecting information to be taken out based upon the criterion which is set by the taken-out information setting unit.

15. A portable information terminal which is part of a learning support system which also includes a learning management server and an information processing apparatus, the portable information terminal comprising a first memory unit for storing first learning contents which comprise a portable use learning program and data for use in learning words in an index, a second memory unit for storing first learning information which includes at least a result of learning at the portable information terminal, a first control unit for executing the portable use learning program to provide first word-learning displays comprising the index words, and a first communication unit for communicating with the learning management server, wherein the first learning information which has been stored in the second memory unit is transferred to the learning management server through the first communication unit, and second learning information, which includes at least a result of learning for the user when the user uses the information processing apparatus, is received from the learning management server through the first communication unit and is stored in the first memory unit, and the second control unit executes the portable use learning program with reference to the second learning information so that the user's learning when the user uses the information processing apparatus can be resumed and continued at the portable information terminal, the first and second learning information includes number of searches for the index words, and the first control unit uses the numbers of searches for the index words to determine which index words are displayed in the first word-learning displays.

16. A portable information terminal of claim 15 comprising an information receiving unit for receiving a plurality of kinds of the second learning information, a test preparation unit for preparing learning contents of a test in accordance with the second learning information, and a display unit for displaying display contents which include the prepared learning contents on a screen.

17. A portable information terminal of claim 16 further comprising an input unit for inputting an answer and an answer evaluation unit for evaluating the inputted answer and displaying an evaluation result on the display unit.

18. A portable information terminal of claim 16 further comprising a display content adjustment unit for adjusting the display contents to be displayed on the display unit in such a manner that the display contents are displayed within one screen of the display unit.

19. A portable information terminal of claim 16, wherein in case that the received test preparation use information comprises a plurality of index words, translations and semantic attributes which correspond to each index word, the test preparation unit prepares learning contents of a test in which a correct translation is asked to be selected from a translation of one index word and a plurality of translations which have the same semantic attribute with regard to the one index word.

20. A portable information terminal of claim 16, wherein in case that the received test preparation use information comprises an index word and text which includes the index word, the test preparation unit searches and deletes the index word from the text and prepares learning contents of a test in which the text with the deleted index word is asked to be filled in with the index word.

21. A portable information terminal of claim 16, wherein in case that the received test preparation use information includes a plurality of index words and a translation which corresponds to one of the index words, the test preparation unit prepares learning contents of a test in which an index word corresponding to the translation is asked to be selected from said plurality of index words.

22. A portable information terminal of claim 16, wherein in case that the received test preparation use information comprises an index word and text which includes the index word and an identification mark is added to the index word in the text, the test preparation unit deletes the index word having the identification mark from the text and prepares learning contents of a test in which the text with the deleted index word is asked to be filled in with the index word.

23. A portable information terminal of claim 16, wherein, in case that the received test preparation use information comprises an index word, text which includes the index word and a plurality of other index words, the test preparation unit deletes the index word in the text and prepares learning contents of a test in which a correct index word is asked to be selected from the deleted index word and said plurality of other index words and the deleted portion of the text is asked to be filled in with the selected index word.

24. A portable information terminal of claim 16, wherein in case that the received test preparation use information comprises an index word and its translation, the test preparation unit prepares learning contents of a test in which the translation of the index word is asked to be answered.

25. A learning management server connecting an information processing apparatus and a portable information terminal through a network and comprising a communication unit for communicating with the information processing apparatus and the portable information terminal, and a first memory unit for storing first learning information which is transferred from the information processing apparatus and second learning information which is transferred from the portable information terminal, and the learning management server transfers the first learning information to the portable information terminal through the communication unit, and transfers the second learning information to the information processing apparatus through the communication unit, wherein the first and second learning information includes numbers of searches for words in an index which are used in learning and control units of the information processing apparatus and the portable information terminal use the numbers of searches for the index words to determine which index words are displayed in respective word-learning displays provided by the information processing apparatus and the portable information terminal.

26. A learning management server of claim 25, wherein the learning management server further comprises a second memory unit, and in case that a user purchases first and second learning contents, the learning management server is connected through the network to a content server which stores the first and second learning contents, the first and second learning contents are acquired from the content server and stored in the second memory unit, and the stored first and second learning contents are transferred to the information processing apparatus and the portable information terminal, respectively.

27. A learning management server of claim 25, wherein the learning management server further comprises a third memory unit for storing pre-registered user information, and in case that the first learning information which is transferred to the first memory unit of the learning management server includes specific user information, the first learning information is transferred only to a portable information terminal which corresponds to user information that is stored in the third memory unit and coincides with the specific user information.

* * * * *